US012588092B2

(12) United States Patent
Zhang et al.

(10) Patent No.: US 12,588,092 B2
(45) Date of Patent: Mar. 24, 2026

(54) TERMINAL DEVICE, CORE NETWORK NODE, NETWORK DEVICE AND METHOD THEREIN FOR FACILITATING PAGING PROCEDURE

(71) Applicant: Telefonaktiebolaget LM Ericsson (publ), Stockholm (SE)

(72) Inventors: Zhang Zhang, Beijing (CN); Min Wang, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 364 days.

(21) Appl. No.: 18/032,389

(22) PCT Filed: Oct. 22, 2021

(86) PCT No.: PCT/CN2021/125500
§ 371 (c)(1),
(2) Date: Apr. 18, 2023

(87) PCT Pub. No.: WO2022/083716
PCT Pub. Date: Apr. 28, 2022

(65) Prior Publication Data
US 2023/0389110 A1     Nov. 30, 2023

(30) Foreign Application Priority Data
Oct. 22, 2020     (WO) ................ PCT/CN2020/122898

(51) Int. Cl.
*H04W 76/20*          (2018.01)
*H04W 68/02*          (2009.01)
(Continued)

(52) U.S. Cl.
CPC ........... *H04W 76/20* (2018.02); *H04W 68/02* (2013.01); *H04W 74/0833* (2013.01); *H04W 74/0836* (2024.01)

(58) Field of Classification Search
CPC ... H04W 40/22; H04W 40/248; H04W 68/02; H04W 74/0833; H04W 74/0836;
(Continued)

(56) References Cited

U.S. PATENT DOCUMENTS

| | | | | |
|---|---|---|---|---|
| 11,716,786 B2 * | 8/2023 | Lee | ...................... | H04W 88/04 |
| | | | | 370/329 |
| 12,396,056 B2 * | 8/2025 | Wang | .................... | H04W 68/02 |

(Continued)

FOREIGN PATENT DOCUMENTS

| | | |
|---|---|---|
| CN | 107889080 A | 4/2018 |
| CN | 108924962 A | 11/2018 |

(Continued)

OTHER PUBLICATIONS

Author Unknown, "Technical Specification Group Services and System Aspects; Study on system enhancement for Proximity based Services (ProSe) in the 5G System (5GS) (Release 17)," Technical Report 23.752, Version 0.5.0, Sep. 2020, 3GPP Organizational Partners, 162 pages.

(Continued)

*Primary Examiner* — Wutchung Chu
(74) *Attorney, Agent, or Firm* — Withrow & Terranova, PLLC

(57) ABSTRACT

The present disclosure provides a method in a first terminal device. The method includes: transmitting, to a core network node, first information indicating that a second terminal device, serving as a relay between the first terminal device and a network device, is in a Radio Resource Control, RRC, Connected, RRC_CONNECTED, state.

20 Claims, 11 Drawing Sheets

(51) Int. Cl.
    *H04W 74/08*     (2024.01)
    *H04W 74/0833*     (2024.01)
    *H04W 74/0836*     (2024.01)
(58) Field of Classification Search
    CPC ..... H04W 76/14; H04W 76/20; H04W 88/04;
                                          Y02D 30/70
    See application file for complete search history.

(56) References Cited

U.S. PATENT DOCUMENTS

| | | | | |
|---|---|---|---|---|
| 2018/0054725 A1* | 2/2018 | Agiwal | ................. | H04W 88/08 |
| 2018/0110001 A1* | 4/2018 | Yasukawa | ......... | H04W 52/0219 |
| 2018/0139794 A1* | 5/2018 | Chae | ................... | H04W 56/002 |
| 2018/0199390 A1* | 7/2018 | Hahn | .................. | H04B 7/2606 |
| 2018/0270895 A1* | 9/2018 | Park | ...................... | H04W 76/38 |
| 2019/0182747 A1* | 6/2019 | Chun | ................... | H04W 48/08 |
| 2019/0223239 A1* | 7/2019 | Adachi | ................ | H04W 92/18 |
| 2020/0008173 A1* | 1/2020 | Kim | ..................... | H04W 76/10 |
| 2020/0015192 A1* | 1/2020 | Chun | ................... | H04W 76/27 |
| 2020/0045626 A1* | 2/2020 | Kim | .................. | H04W 28/0289 |
| 2020/0077253 A1* | 3/2020 | Kim | .................... | H04W 76/30 |
| 2020/0100308 A1* | 3/2020 | Lee | ...................... | H04W 76/25 |
| 2020/0100325 A1* | 3/2020 | Chang | .................. | H04W 76/27 |
| 2020/0170075 A1* | 5/2020 | Xu | ....................... | H04B 7/2606 |
| 2020/0187298 A1* | 6/2020 | Chun | ................... | H04W 68/02 |
| 2021/0289580 A1* | 9/2021 | Damnjanovic | ....... | H04W 24/02 |
| 2021/0298112 A1* | 9/2021 | Chen | ..................... | H04W 4/02 |
| 2022/0061020 A1* | 2/2022 | Wang | ................. | H04W 68/005 |
| 2022/0061021 A1* | 2/2022 | Wang | ................... | H04L 1/0061 |
| 2022/0095411 A1* | 3/2022 | Lin | ...................... | H04W 76/27 |
| 2022/0312535 A1* | 9/2022 | Wu | ..................... | H04L 65/1016 |
| 2022/0338283 A1* | 10/2022 | Wang | .................. | H04W 76/14 |
| 2022/0345879 A1* | 10/2022 | Park | ..................... | H04W 80/10 |
| 2023/0014030 A1* | 1/2023 | Li | ........................ | H04W 76/10 |
| 2023/0023135 A1* | 1/2023 | Liu | ........................ | H04W 4/00 |
| 2023/0217413 A1* | 7/2023 | Cheng | .................. | H04W 68/02 |
| | | | | 455/458 |
| 2023/0239714 A1* | 7/2023 | Fujishiro | ................ | H04W 4/40 |
| | | | | 370/329 |
| 2023/0246701 A1* | 8/2023 | Cheng | .............. | H04W 72/0453 |
| | | | | 370/315 |
| 2023/0247695 A1* | 8/2023 | Fujishiro | ............... | H04W 76/19 |
| | | | | 370/328 |
| 2023/0284046 A1* | 9/2023 | Ly | ......................... | H04W 36/08 |
| | | | | 370/329 |
| 2023/0284206 A1* | 9/2023 | Hoang | .............. | H04W 72/1263 |
| | | | | 370/329 |
| 2023/0284293 A1* | 9/2023 | Hong | .................... | H04W 76/14 |
| | | | | 370/329 |
| 2023/0309009 A1* | 9/2023 | Back | ...................... | H04W 48/20 |
| 2024/0098815 A1* | 3/2024 | Freda | .................. | H04W 68/005 |

FOREIGN PATENT DOCUMENTS

| | | | | |
|---|---|---|---|---|
| CN | 110249670 A | 9/2019 | | |
| JP | 2024537446 A | * 10/2024 | ........... | H04W 68/02 |
| WO | WO-2019073070 A1 * | 4/2019 | ........... | H04W 76/10 |
| WO | WO-2022083716 A1 * | 4/2022 | ........... | H04W 76/14 |

OTHER PUBLICATIONS

Author Unknown, "Technical Specification Group Radio Access Network; Study on further enhancements to LTE Device to Device (D2D), User Equipment (UE) to network relays for Internet of Things (IoT) and wearables; (Release 15)," Technical Report 36.746, Version 15.1.1, Apr. 2018, 3GPP Organizational Partners, 55 pages.
Author Unknown, "Technical Specification Group Radio Access Network; NR; NR and NG-RAN Overall Description; Stage 2 (Release 16)," Technical Specification 38.300, Version 16.3.0, Sep. 2020, 3GPP Organizational Partners, 148 pages.
LG Electronics Inc., "R2-1701933: RRC connection establishment for idle and connected relay UE," 3GPP TSG-RAN WG2 Meeting #97, Feb. 13-17, 2017, Athens, Greece, 3 pages.
Oppo, "RP-193253: New SID: Study on NR sidelink relay," 3GPP TSG RAN Meeting #86, Dec. 9-12, 2019, Sitges, Spain, 5 pages.
ZTE, "R2-168199: Discussion on the RRC state of remote UE and relay UE," 3GPP TSG-RAN WG2 Meeting #96, Nov. 14-18, 2016, Reno, Nevada, 5 pages.
International Search Report and Written Opinion for International Patent Application No. PCT/CN2021/125500, mailed Jan. 12, 2022, 10 pages.

* cited by examiner

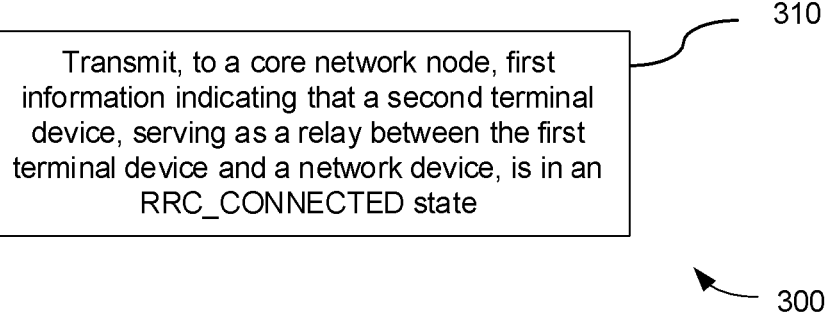

310

Transmit, to a core network node, first information indicating that a second terminal device, serving as a relay between the first terminal device and a network device, is in an RRC_CONNECTED state

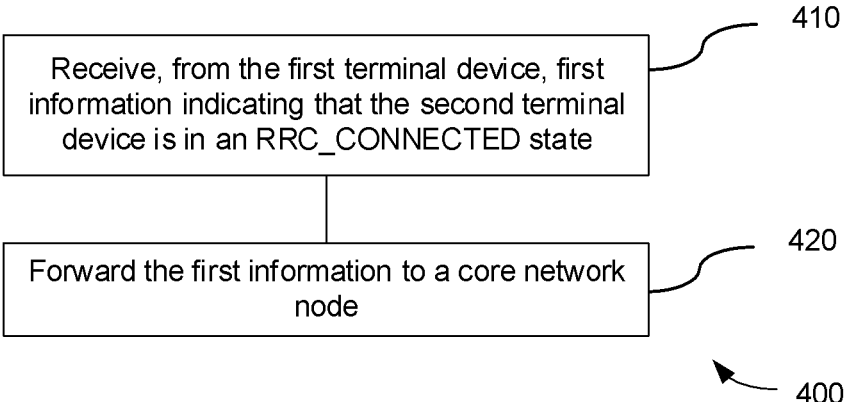

410

Receive, from the first terminal device, first information indicating that the second terminal device is in an RRC_CONNECTED state

420

Forward the first information to a core network node

FIRST TERMINAL DEVICE
700

FIRST TERMINAL DEVICE
800

SECOND TERMINAL DEVICE
900

SECOND TERMINAL DEVICE
1000

CORE NETWORK NODE
1100

CORE NETWORK NODE
1200

NETWORK DEVICE
1300

NETWORK DEVICE
1400

TERMINAL DEVICE, CORE NETWORK NODE, NETWORK DEVICE AND METHOD THEREIN FOR FACILITATING PAGING PROCEDURE

This application is a 35 U.S.C. § 371 national phase filing of International Application No. PCT/CN2021/125500, filed Oct. 22, 2021, which claims the benefit of International Application No. PCT/CN2020/122898, filed Oct. 22, 2020, the disclosures of which are incorporated herein by reference in their entireties.

TECHNICAL FIELD

The present disclosure relates to communication technology, and more particularly, to terminal devices, a core network node, a network device, and methods therein for facilitating a paging procedure.

BACKGROUND

The $3^{rd}$ Generation Partnership Project (3GPP) specified Long Term Evolution (LTE) Device-to-Device (D2D) technology, also known as ProSe (Proximity Services) in Releases 12 and 13 of LTE. Later in Releases 14 and 15, LTE Vehicle-to-Everything (V2X) related enhancements targeting specific characteristics of vehicular communications were specified. The 3GPP has started a new Work Item (WI) in August 2018 within the scope of Release 16 to develop a New Radio (NR) version of V2X communications. The NR V2X mainly targets advanced V2X services, which can be categorized into four use case groups: vehicles platooning, extended sensors, advanced driving, and remote driving. The advanced V2X services would require an enhanced NR system and a new NR sidelink framework to meet stringent requirements in terms of latency and reliability. The NR V2X system is also expected to have higher system capacity and better coverage and to allow for an easy extension to support the future development of further advanced V2X services and other services.

Given the targeted services in the NR V2X, it is commonly recognized that groupcast/multicast and unicast transmissions are desired, in which intended receivers of a message consist of only a subset of vehicles in proximity to a transmitter (groupcast) or of a single vehicle (unicast). For example, in the platooning service there are certain messages that are only of interest to members of the platoon, making the members of the platoon a natural groupcast. In another example, a see-through use case most likely involves only a pair of vehicles, for which unicast transmissions naturally fit. Therefore, the NR sidelink can support broadcast (as in LTE), groupcast and unicast transmissions. Furthermore, the NR sidelink is designed in such a way that its operation is possible with or without network coverage and with varying degrees of interaction between User Equipments (UEs) and the network, including support for standalone, network-less operations.

In 3GPP Release 17, discussions are in progress and National Security and Public Safety (NSPS) is considered to be one important use case, which can benefit from the already developed NR sidelink features in Release 16. Therefore, it is most likely that the 3GPP will specify enhancements related to the NSPS use case taking NR Release 16 sidelink as a baseline. In addition, in some scenarios NSPS services need to operate with partial or without network coverage, such as indoor firefighting, forest firefighting, earthquake rescue, sea rescue, etc., where the infrastructure may be (partially) destroyed or not available, and therefore coverage extension is a crucial enabler for NSPS, for both NSPS services communicated between UEs and a cellular network and NSPS services communicated between UEs over sidelink. In Release 17, a new Study Item Description (SID) on NR sidelink relay (RP-193253) is launched, which aims to further explore coverage extension for sidelink-based communications, including both UE-to-network relay for cellular coverage extension and UE-to-UE relay for sidelink coverage extension.

In a Layer 2 (L2) UE-to-network relay scenario, a UE-to-network relay UE provides functionality to support connectivity to the 5th Generation System (5GS) for remote UEs. FIGS. 1A and 1B show user plane and control plane protocol stacks for a UE-to-network relay UE, respectively. As shown in FIG. 1A, two endpoints of the Packet Data Convergence Protocol (PDCP) link are the remote UE and the (next) generation NodeB (gNB), which means the remote UE has its own context in the Radio Access Network (RAN) and the core network (CN). That is, the remote UE has its own radio bearer, Radio Resource Control (RRC) connection and Protocol Data Unit (PDU) session. The relay function is performed below the PDCP layer, e.g., at an adaptation layer. The remote UE's traffic (both control plane and user plane) is transparently transferred between the remote UE and the gNB via the L2 UE-to-network relay UE without any modifications. The adaptation layer between the L2 UE-to-network relay UE and the gNB is able to differentiate between Uu bearers of a particular remote UE. Different remote UEs and different Uu bearers of the remote UEs are indicated by additional information (e.g. UE identifiers (IDs) and bearer IDs) included in an adaptation layer header which is added to a PDCP PDU. The adaptation layer can be considered as part of the PDCP sub-layer or a separate new layer between the PDCP sub-layer and the Radio Link Control (RLC) sub-layer. For further details of the protocol stacks, reference can be made to 3GPP Technical Report (TR) 23.752, V0.5.0, which is incorporated herein by reference in its entirety.

As described in Clause 9.2.5 in 3GPP Technical Specification (TS) 38.300, V16.3.0, which is incorporated herein by reference in its entirety, paging allows the network to reach UEs in RRC_IDLE and in RRC_INACTIVE state through paging messages, and to notify UEs in RRC_IDLE, RRC_INACTIVE and RRC_CONNECTED state of system information change (see Clause 7.3.3 in TS 38.300) and Earthquake and Tsunami Warning System (ETWS)/Commercial Mobile Alert System (CMAS) indications (see Clause 16.4 in TS 38.300) through short messages. Both paging messages and short messages are addressed with Paging-Radio Network Temporary Identity (P-RNTI) on Physical Downlink Control Channel (PDCCH), but while the former is sent on Paging Control Channel (PCCH), the latter is sent over PDCCH directly.

A UE monitors paging channels for CN-initiated paging while in the RRC_IDLE state, and also monitors paging channels for RAN-initiated paging while in the RRC_INACTIVE state. However, the UE does not need to monitor the paging channels continuously. Paging Discontinuous Reception (DRX) is defined where a UE in the RRC_IDLE or RRC_INACTIVE state is only required to monitor the paging channels during one Paging Occasion (PO) per DRX cycle. The Paging DRX cycles are configured by the network as follows:

1) For CN-initiated paging, a default cycle is broadcast in system information;

2) For CN-initiated paging, a UE specific cycle can be configured via Non-Access Stratum (NAS) signaling; and 3) For RAN-initiated paging, a UE-specific cycle is configured via RRC signaling.

A UE uses the shortest of the DRX cycles applicable, i.e., a UE in RRC_IDLE uses the shortest of the first two cycles above, while a UE in RRC_INACTIVE uses the shortest of the three. The POs of a UE for CN-initiated paging and RAN-initiated paging are based on the same UE ID, resulting in overlapping POs. The number of different POs in a DRX cycle is configurable via system information and a network may distribute UEs to those POs based on their IDs.

When in RRC_CONNECTED, a UE monitors the paging channels in any PO signaled in system information for system information change and Public Warning System (PWS) notification. In case of bandwidth adaptation, a UE in RRC_CONNECTED only monitors paging channels on an active Bandwidth Part (BWP) with Common Search Space (CSS) configured. For operation with shared spectrum channel access, a UE can be configured with a number of additional PDCCH monitoring occasions in its PO to monitor for the paging purpose. However, when the UE detects a PDCCH transmission within the UE's PO addressed with its P-RNTI, the UE is not required to monitor subsequent PDCCH monitoring occasions within this PO.

For paging optimization for UEs in a Connection Management Idle (CM_IDLE) state, at UE context release, a Next Generation (NG)-RAN node may provide an Access and Mobility Management Function (AMF) with a list of recommended cells and NG-RAN nodes as assistance information for subsequent paging. The AMF may also provide Paging Attempt Information consisting of a Paging Attempt Count and an Intended Number of Paging Attempts and optionally a Next Paging Area Scope. If the Paging Attempt Information is included in the paging message, each paged NG-RAN node receives the same information during a paging attempt. The Paging Attempt Count shall be increased by one at each new paging attempt. The Next Paging Area Scope, when present, indicates whether the AMF plans to modify the paging area currently selected at the next paging attempt. If the UE has changed its state to CM_CONNECTED, the Paging Attempt Count is reset.

For paging optimization for UEs in RRC_INACTIVE, at RAN Paging, a serving NG-RAN node provides RAN Paging area information. The serving NG-RAN node may also provide RAN Paging attempt information. Each paged NG-RAN node receives the same RAN Paging attempt information during a paging attempt with the following content: a Paging Attempt Count, an Intended Number of Paging Attempts, and a Next Paging Area Scope. The Paging Attempt Count shall be increased by one at each new paging attempt. The Next Paging Area Scope, when present, indicates whether the serving NG_RAN node plans to modify the RAN Paging Area currently selected at next paging attempt. If the UE leaves RRC_INACTIVE state, the Paging Attempt Count is reset.

In the L2 UE-to-network relay scenario as described above, when the remote UE is in the RRC_IDLE or RRC_INACTIVE state and there is incoming downlink data traffic for the remote UE, the network will page the remote UE and the relay UE supports forwarding of paging to the remote UE. In LTE, a number of possible paging options with which the remote UE in RRC_IDLE can be reached are investigated in 3GPP TR 36.746 V15.1.1, which is incorporated here by reference in its entirety, and it has been agreed in RAN2 that Paging Option 2 in TR 36.746 is selected as the baseline paging relaying solution for NR L2 UE-to-network relay. FIG. 2 shows Paging Option 2 in TR 36.746. As shown, according to this option, an evolved L2 ProSe UE-to-network relay UE monitors its linked evolved ProSe remote UE's PO in addition to its own PO. The evolved ProSe remote UE does not need to attempt paging reception over downlink while linked to the evolved L2 ProSe UE-to-network relay UE. The evolved L2 ProSe UE-to-network relay UE may need to monitor multiple paging occasions. The evolved L2 ProSe UE-to-network relay UE has to know the paging occasion of the evolved ProSe remote UE and has to decode a paging message and determine which evolved ProSe remote UE the paging is for. Also, the evolved L2 ProSe UE-to-network relay UE may need to relay the evolved ProSe remote UE's paging over short range link.

This option is advantageous in the following aspects. It is commonly applicable to both when the evolved ProSe remote UE is in and out of RAN coverage. The evolved ProSe remote UE does not need to attempt paging reception over downlink while linked to the evolved ProSe UE-to-network relay UE. This is more power efficient for the evolved ProSe remote UE. The network does not need to know whether the evolved ProSe remote UE and the evolved ProSe UE-to-network relay UE are linked or associated. However, the evolved ProSe UE-to-network relay UE needs to monitor multiple POs. This is less power efficient for the evolved ProSe UE-to-network relay UE as the power consumption may increase depending on the number of evolved ProSe remote UEs linked to the evolved ProSe UE-to-network relay UE. Moreover, the evolved ProSe UE-to-network relay UE needs to relay evolved ProSe remote UE's paging over short range link. This causes additional power consumption for the evolved ProSe UE-to-network relay UE and additional use of sidelink resources.

SUMMARY

As described above in connection with FIG. 2, the relay UE needs to monitor multiple POs, which is less power efficient. This problem is especially prominent for a UE in RRC_CONNECTED, which is not required to monitor POs for the purpose of receiving paging messages triggered by e.g., arrival of downlink data traffic. Moreover, broadcasting paging messages over multiple gNBs in a RAN Notification Area (RNA) is also power consuming. It is therefore desired to reduce power consumption at both the gNB side and the UE side for paging remote UEs.

It is an object of the present disclosure to provide terminal devices, a core network node, a network device, and methods therein, capable of reducing power consumption during a paging procedure.

According to a first aspect of the present disclosure, a method in a first terminal device is provided. The method includes: transmitting, to a core network node, first information indicating that a second terminal device, serving as a relay between the first terminal device and a network device, is in an RRC_CONNECTED state.

In an embodiment, the method may further include: transmitting, to the core network node, second information indicating an ID of the network device and/or third information indicating an ID of the second terminal device.

In an embodiment, the ID of the second terminal device may include a Cell-Radio Network Temporary Identifier (C-RNTI), or a next generation-5th Generation-Serving-Temporary Mobile Subscriber Identity (ng-5G-S-TMSI) of the second terminal device.

In an embodiment, the first information, the second information, and/or the third information may be obtained from the second terminal device via PC5-RRC signaling, or in a Medium Access Control-Control Element (MAC CE), or a control PDU of a Service Data Adaptation Protocol (SDAP), PDCP, RLC, or adaptation layer.

In an embodiment, the first information, the second information, and/or the third information may be transmitted to the core network node via the second terminal device.

In an embodiment, the first information, the second information, and/or the third information may be included in a message destined to the core network node. Alternatively, the first information, the second information, and/or the third information may be included in a message terminated at the second terminal device for forwarding to the core network node, and the message may contain an ID of the core network node.

In an embodiment, the method may further include: notifying the core network node to release the first information, the second information, and/or the third information when the first terminal device has reselected another relay that is not in the RRC_CONNECTED state, when the first terminal device has reselected a direct link with the network device, or when the second terminal device has transitioned to a different state than the RRC_CONNECTED state.

In an embodiment, the core network node may be a serving AMF node of the first terminal device.

In an embodiment, the network device may be a serving gNB of the second terminal device.

In an embodiment, the first terminal device may be in an RRC_IDLE or RRC_INACTIVE state.

In an embodiment, the first terminal device and the second terminal device may communicate with each other over a sidelink.

In an embodiment, the method may further include: receiving, from the second terminal device, a paging message for paging the first terminal device; and initiating, in response to the paging message, establishment or resumption of a connection with the network device via the second terminal device.

In an embodiment, the paging message may be received via PC5-RRC signaling, or in a MAC CE or a control PDU of an SDAP, PDCP, RLC or adaptation layer.

In an embodiment, the operation of initiating may include: initiating a Random Access Channel (RACH) procedure with the network device via the second terminal device, transmitting an RRC message to the network device via the second terminal device, transmitting a MAC CE to the network device via the second terminal device, or transmitting a Physical Uplink Control Channel (PUCCH) to the network device via the second terminal device.

In an embodiment, a message in the RACH procedure or a Physical Random Access Channel (PRACH) preamble or resource used in the RACH procedure may indicate that the RACH procedure is for the first terminal device to establish or resume the connection with the network device. The RRC message may indicate a request from the first terminal device to establish or resume the connection with the network device. The MAC CE may indicate a request from the first terminal device to establish or resume the connection with the network device. A resource of the PUCCH may indicate that the PUCCH is for the first terminal device to establish or resume the connection with the network device.

According to a second aspect of the present disclosure, a first terminal device is provided. The first terminal device includes a transceiver, a processor and a memory. The memory contains instructions executable by the processor whereby the first terminal device is operative to perform the method according to the above first aspect.

According to a third aspect of the present disclosure, a computer readable storage medium is provided. The computer readable storage medium has computer program instructions stored thereon. The computer program instructions, when executed by a processor in a first terminal device, cause the first terminal device to perform the method according to the above first aspect.

According to a fourth aspect of the present disclosure, a method in a second terminal device is provided. The second terminal device serves as a relay between the first terminal device and a network device. The method includes: receiving, from the first terminal device, first information indicating that the second terminal device is in an RRC_CONNECTED state; and forwarding the first information to a core network node.

In an embodiment, the method may further include: receiving, from the first terminal device, second information indicating an ID of the network device and/or third information indicating an ID of the second terminal device; and forwarding the second information and/or the third information to the core network node.

In an embodiment, the ID of the second terminal device may include a C-RNTI or an ng-5G-S-TMSI of the second terminal device.

In an embodiment, the method may further include: transmitting the first information, the second information, and/or the third information to the first terminal device via PC5-RRC signaling, or in a MAC CE or a control PDU of an SDAP, PDCP, RLC, or adaptation layer.

In an embodiment, the first information, the second information, and/or the third information may be included in a message destined to the core network node, and may be forwarded to the core network node transparently. Alternatively, the first information, the second information, and/or the third information may be included in a message terminated at the second terminal device, the message containing an ID of the core network node, and may be forwarded to a serving core network node of the second terminal device for further forwarding to the core network node.

In an embodiment, the method may further include: receiving, from the first terminal device, a notification to release the first information, the second information, and/or the third information when the first terminal device has reselected another relay that is not in the RRC_CONNECTED state, when the first terminal device has reselected a direct link with the network device, or when the second terminal device has transitioned to a different state than the RRC_CONNECTED state; and forwarding the notification to the core network node.

In an embodiment, the core network node may be a serving AMF node of the first terminal device.

In an embodiment, the network device may be a serving gNB of the second terminal device.

In an embodiment, the method may further include: transmitting, to the network device, fourth information indicating an ID of the first terminal device.

In an embodiment, the fourth information may be obtained from the first terminal device via PC5-RRC signaling, or in a MAC CE or a control PDU of an SDAP, PDCP, RLC or adaptation layer.

In an embodiment, the method may further include: notifying the network device to release the fourth information when the first terminal device has reselected another relay, when the first terminal device has reselected a direct link with the network device, or when the second terminal device has transitioned to a different state than the RRC-_CONNECTED state.

In an embodiment, the first terminal device may be in an RRC_IDLE or RRC_INACTIVE state.

In an embodiment, the first terminal device and the second terminal device may communicate with each other over a sidelink.

In an embodiment, the method may further include: receiving, from the network device, a first paging message for paging the first terminal device; and transmitting, to the first terminal device, a second paging message for paging the first terminal device based on the first paging message.

In an embodiment, the first paging message may be received via dedicated RRC signaling, RRC signaling, MAC CE, or Layer 1 (L1) control signaling.

In an embodiment, the second paging message may be transmitted via PC5-RRC signaling, or in a MAC CE or a control PDU of an SDAP, PDCP, RLC or adaptation layer.

In an embodiment, the method may further include: receiving, from the first terminal device, a request for establishment or resumption of a connection with the network device by: initiating an RACH procedure with the network device, transmitting an RRC message to the network device, transmitting a MAC CE to the network device, or transmitting a PUCCH to the network device.

In an embodiment, a message in the RACH procedure or a PRACH preamble or resource used in the RACH procedure may indicate that the RACH procedure is for the first terminal device to establish or resume the connection with the network device. The RRC message may indicate a request from the first terminal device to establish or resume the connection with the network device. The MAC CE may indicate a request from the first terminal device to establish or resume the connection with the network device. A resource of the PUCCH may indicate that the PUCCH is for the first terminal device to establish or resume the connection with the network device.

According to a fifth aspect of the present disclosure, a second terminal device is provided. The second terminal device includes a transceiver, a processor and a memory. The memory contains instructions executable by the processor whereby the second terminal device is operative to perform the method according to the above fourth aspect.

According to a sixth aspect of the present disclosure, a computer readable storage medium is provided. The computer readable storage medium has computer program instructions stored thereon. The computer program instructions, when executed by a processor in a second terminal device, cause the second terminal device to perform the method according to the above fourth aspect.

According to a seventh aspect of the present disclosure, a method in a core network node is provided. The method includes: receiving first information indicating that a second terminal device, serving as a relay between a first terminal device and a network device, is in an RRC_CONNECTED state; and transmitting a paging message for paging the first terminal device, the paging message containing the first information.

In an embodiment, the paging message may be transmitted to a plurality of network devices within a paging area.

In an embodiment, the method may further include: receiving second information indicating an ID of the network device. The paging message may be transmitted to the network device.

In an embodiment, the method may further include: receiving third information indicating an ID of the second terminal device. The paging message may further contain the third information.

In an embodiment, the core network node may be a serving AMF node of the first terminal device.

In an embodiment, the network device may be a serving gNB of the second terminal device.

According to an eighth aspect of the present disclosure, a core network node is provided. The core network node includes a communication interface, a processor and a memory. The memory contains instructions executable by the processor whereby the core network node is operative to perform the method according to the above seventh aspect.

According to a ninth aspect of the present disclosure, a computer readable storage medium is provided. The computer readable storage medium has computer program instructions stored thereon. The computer program instructions, when executed by a processor in a core network node, cause the core network node to perform the method according to the above seventh aspect.

According to a tenth aspect of the present disclosure, a method in a network device is provided. The method includes: receiving, from a core network node, a first paging message for paging a first terminal device, the first paging message indicating that a second terminal device, serving as a relay between the first terminal device and the network device, is in an RRC_CONNECTED state; and transmitting a second paging message for paging the first terminal device based on the first paging message.

In an embodiment, the second paging message may be transmitted to one or more terminal devices each serving as a relay and being in the RRC_CONNECTED state.

In an embodiment, the first paging message may further indicate an ID of the second terminal device, and the second paging message may be transmitted to the second terminal device.

In an embodiment, the method may further include: receiving, from the second terminal device, information indicating an ID of the first terminal device. The second paging message may be transmitted to the second terminal device.

In an embodiment, the second paging message may be transmitted via dedicated RRC signaling, RRC signaling, MAC CE, or L1 control signaling.

In an embodiment, the method may further include: receiving, from the second terminal device, a RACH message, an RRC message, a MAC CE, or a PUCCH. The RACH message or a PRACH preamble or resource used for the RACH message may indicate that the RACH message is for the first terminal device to establish or resume the connection with the network device. The RRC message may indicate a request from the first terminal device to establish or resume the connection with the network device. The MAC CE may indicate a request from the first terminal device to establish or resume the connection with the network device. A resource of the PUCCH may indicate that the PUCCH is for the first terminal device to establish or resume the connection with the network device.

In an embodiment, the network device may be a serving gNB of the second terminal device.

According to an eleventh aspect of the present disclosure, a network device is provided. The network device includes a communication interface, a processor and a memory. The memory contains instructions executable by the processor whereby the network device is operative to perform the method according to the above tenth aspect.

According to a twelfth aspect of the present disclosure, a computer readable storage medium is provided. The computer readable storage medium has computer program instructions stored thereon. The computer program instructions, when executed by a processor in a network device, cause the network device to perform the method according to the above tenth aspect.

With the embodiments of the present disclosure, a remote UE transmits, to a core network node, information indicating that its linked relay UE is in an RRC_CONNECTED state. Accordingly, the core network node can include the information in a paging message for paging the remote UE, such that a network device, upon receiving the paging message, can page the remote UE by means of e.g., dedicated RRC signaling towards the relay UE. In this way, the relay UE, while in the RRC_CONNECTED state, is enabled to relay the paging for the remote UE without having to monitor POs for the remote UE, which is more power efficient for the relay UE.

BRIEF DESCRIPTION OF THE DRAWINGS

The above and other objects, features and advantages will be more apparent from the following description of embodiments with reference to the figures, in which:

FIG. 3 is a flowchart illustrating a method in a first terminal device according to an embodiment of the present disclosure;

FIG. 4 is a flowchart illustrating a method in a second terminal device according to an embodiment of the present disclosure;

DETAILED DESCRIPTION

Figure 1A:
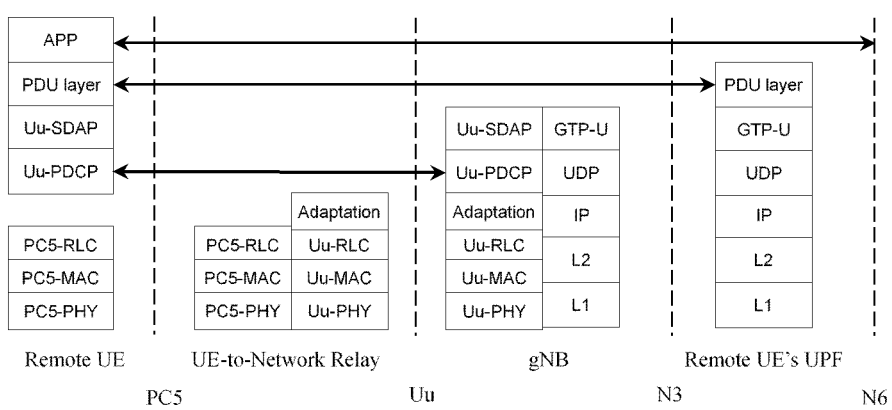
FIGS. 1A and 1B are schematic diagrams showing user plane and control plane protocol stacks for a UE-to-network relay UE, respectively.

As used herein, the term "wireless communication network" refers to a network following any suitable communication standards, such as NR, LTE-Advanced (LTE-A), LTE, Wideband Code Division Multiple Access (WCDMA), High-Speed Packet Access (HSPA), and so on. Furthermore, the communications between a terminal device and a network node in the wireless communication network may be performed according to any suitable generation communication protocols, including, but not limited to, Global System for Mobile Communications (GSM), Universal Mobile Telecommunications System (UMTS), Long Term Evolution (LTE), and/or other suitable 1G (the first generation), 2G (the second generation), 2.5G, 2.75G, 3G (the third generation), 4G (the fourth generation), 4.5G, 5G (the fifth generation) communication protocols, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "core network node" refers to a node implementing a core network function, either as a network element on a dedicated hardware, as a software instance running on a dedicated hardware, or as a virtualized function instantiated on an appropriate platform, e.g. on a cloud infrastructure.

The term "network device" refers to a device in a wireless communication network via which a terminal device accesses the network and receives services therefrom. The network device refers to a base station (BS), an access point (AP), or any other suitable device in the wireless communication network. The BS may be, for example, a node B (NodeB or NB), an evolved NodeB (eNodeB or eNB), or a (next) generation (gNB), a Remote Radio Unit (RRU), a radio header (RH), a remote radio head (RRH), a relay, a low power node such as a femto, a pico, and so forth. Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, desktop computers, image capture terminal devices such as digital cameras, gaming terminal devices, music storage and playback appliances, a mobile phone, a cellular phone, a smart phone, voice over IP (VoIP) phones, wireless local loop phones, tablets, personal digital assistants (PDAs), wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

The terminal device may support device-to-device (D2D) communication, for example by implementing a 3GPP standard for sidelink communication, and may in this case be referred to as a D2D communication device.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink transmission refers to a transmission from the network device to a terminal device, and an uplink transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms. The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

The following embodiments of the present disclosure will be described mainly in the context of NR sidelink communications. However, the embodiments are equivalently applicable to any other radio access technologies allowing direct communications between UEs, including D2D communications.

Figure 1B:
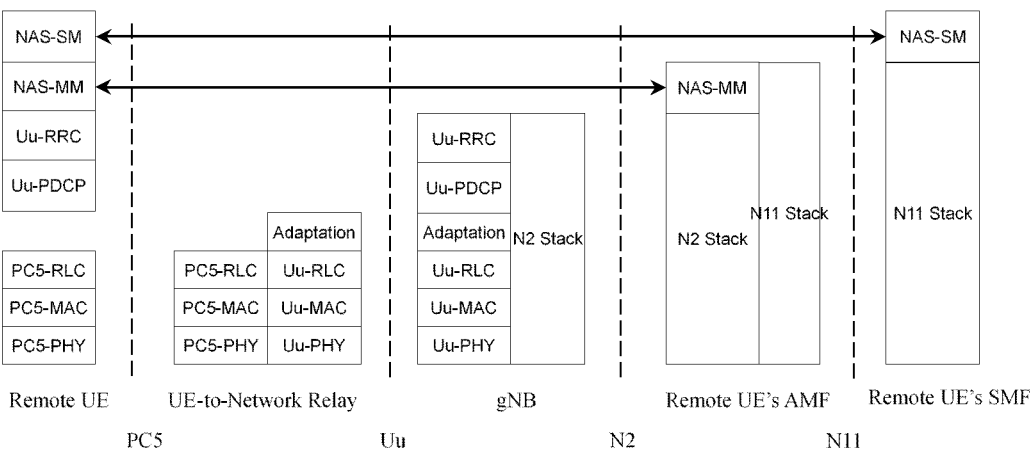
Figure 2:
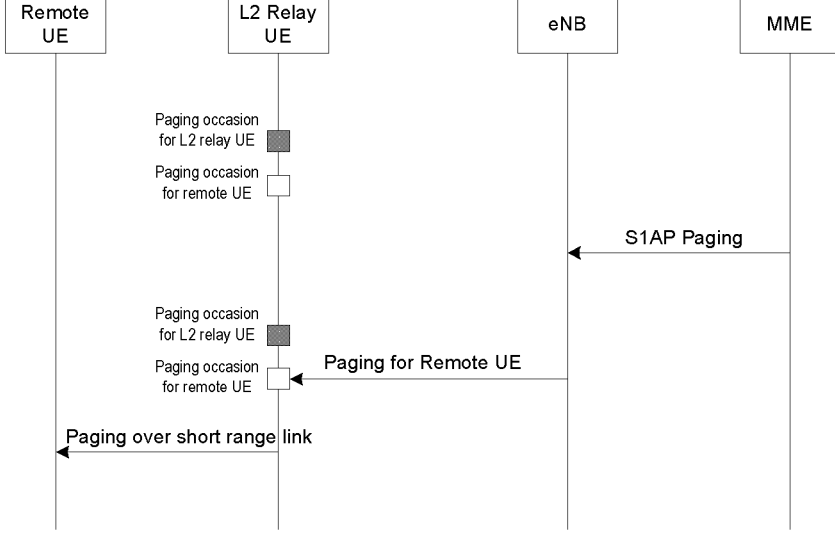
FIG. 2 is a schematic diagram showing a paging option for a remote UE.

FIG. 3 is a flowchart illustrating a method 300 according to an embodiment of the present disclosure. The method 300 can be performed at a first terminal device (referred to as remote UE hereinafter), e.g., Remote UE in FIGS. 1A, 1B, and 2. The first terminal device can communicate with a second terminal device (referred to as relay UE hereinafter), e.g., UE-to-Network Relay UE or L2 Relay UE in FIGS. 1A, 1B, and 2, over a sidelink (PC5). Accordingly, the relay UE serves as a relay between the remote UE and a network device (e.g., a gNB, which can be a serving gNB of the relay UE). The remote UE may be in an RRC_IDLE or RRC_INACTIVE state, and the relay UE may be in an RRC_CONNECTED state.

At block 310, first information is transmitted to a core network node (e.g., a serving AMF node of the remote UE), indicating that the relay UE is in the RRC_CONNECTED state.

In an example, in addition to the first information, second information indicating an ID of the network device and/or third information indicating an ID of the relay UE can be transmitted to the core network node. Here, the ID of the relay UE may include a C-RNTI or an ng-5G-S-TMSI of the relay UE.

For example, the remote UE may transmit the first information, the second information, and/or the third information to the core network node once the remote UE has established the sidelink connection towards the relay UE.

In an example, e.g., prior to the block 310, the remote UE may obtain the first information, the second information, and/or the third information from the relay UE via PC5-RRC signaling, or in a MAC CE or a control PDU of an SDAP, PDCP, RLC, or adaptation layer.

In an example, the remote UE may transmit the first information, the second information, and/or the third information to the core network node via the relay UE, or directly when the remote UE is in coverage and has a Uu link. Here, the first information, the second information, and/or the third information may be included in a message (e.g., a NAS message) destined to the core network node.

In this case the relay UE can forward the message to the core network node transparently. Alternatively, the first information, the second information, and/or the third information may be included in a message (e.g., a sidelink message) terminated at the relay UE for forwarding to the core network node. In this case the message may contain an ID of the core network node, as well as a 5G Global Unique Temporary UE Identity (GUTI) or an ng-5G-S-TMSI of the remote UE.

In an example, when the remote UE has reselected another relay that is not in the RRC_CONNECTED state, when the remote UE has reselected a direct link with the network device, or when the relay UE has transitioned to a different state than the RRC_CONNECTED state, the remote UE can notify the core network node to release the first information, the second information, and/or the third information.

In an example, the remote UE may receive from the relay UE a paging message for paging the remote UE, e.g., via PC5-RRC signaling, or in a MAC CE or a control PDU of an SDAP, PDCP, RLC or adaptation layer. In response to the paging message, the remote UE can initiate establishment (when in RRC_IDLE) or resumption (when in RRC_INAC-TIVE) of a connection with the network device via the relay UE, by: initiating a RACH procedure with the network device via the relay UE, transmitting an RRC message to the network device via the relay UE, transmitting a MAC CE to the network device via the relay UE, or transmitting a PUCCH to the network device via the relay UE. Here, a message in the RACH procedure can indicate that the RACH procedure is for the remote UE to establish or resume the connection with the network device. For example, Mes-sage 1 (Msg1) in 4-step RACH procedure or Message A (MsgA) in 2-step RACH procedure may indicate that the RACH procedure is for the remote UE to establish or resume the connection with the network device. Alternatively, an indicator may be included in e.g., Message 3 (Msg3) in 4-step RACH procedure or MsgA payload in 2-step RACH procedure to indicate that the RACH procedure is for the remote UE to establish or resume the connection with the network device. The indicator may alternatively be carried in a MAC CE, a MAC subheader or an RRC message. A PRACH preamble or resource (e.g., occasions) used in a RACH procedure can indicate that the RACH procedure is for the remote UE to establish or resume the connection with the network device (e.g., specific PRACH preambles or resources may be configured for respective remote UEs). The RRC message can indicate a request from the remote UE to establish or resume the connection with the network device. The MAC CE can indicate a request from the remote UE to establish or resume the connection with the network device. A resource of the PUCCH may indicate that the PUCCH is for the remote UE to establish or resume the connection with the network device (e.g., specific PUCCH resources (frequency/time) may be configured for respective remote UEs).

FIG. 4 is a flowchart illustrating a method 400 according to an embodiment of the present disclosure. The method 400 can be performed at a second terminal device (referred to as relay UE hereinafter), e.g., UE-to-Network Relay UE or L2 Relay UE in FIGS. 1A, 1B, and 2. The second terminal device can communicate with a first terminal device (re-ferred to as remote UE hereinafter), e.g., Remote UE in FIGS. 1A, 1B, and 2, over a sidelink (PC5). Accordingly, the relay UE serves as a relay between the remote UE and a network device (e.g., a gNB, which can be a serving gNB of the relay UE). The remote UE may be in an RRC_IDLE or RRC_INACTIVE state, and the relay UE may be in an RRC_CONNECTED state.

At block 410, first information is received from the remote UE, indicating that the relay UE is in the RRC_CO-NNECTED state.

At block 420, the first information is forwarded to a core network node (e.g., a serving AMF node of the remote UE).

In an example, in addition to the first information, second information indicating an ID of the network device and/or third information indicating an ID of the relay UE can be received from the remote UE and forwarded to the core network node. Here, the ID of the relay UE may include a C-RNTI or an ng-5G-S-TMSI of the relay UE.

In an example, e.g., prior to the block 410, the relay UE may transmit the first information, the second information, and/or the third information to the remote UE via PC5-RRC signaling, or in a MAC CE or a control PDU of an SDAP, PDCP, RLC, or adaptation layer.

In an example, the first information, the second informa-tion, and/or the third information may be included in a message (e.g., a NAS message) destined to the core network node, and may be forwarded to the core network node transparently in the block 420. Alternatively, the first infor-mation, the second information, and/or the third information may be included in a message (e.g., a sidelink message) terminated at the relay UE. In this case the message may contain an ID of the core network node, as well as a 5G GUTI or an ng-5G-S-TMSI of the remote UE. The first information, the second information, and/or the third infor-mation may be forwarded to a serving core network node of the relay UE for further forwarding to the core network node.

In an example, when the remote UE has reselected another relay that is not in the RRC_CONNECTED state, when the remote UE has reselected a direct link with the network device, or when the relay UE has transitioned to a different state than the RRC_CONNECTED state, the relay UE may receive from the remote UE a notification to release the first information, the second information, and/or the third information, and forward the notification to the core network node.

In an example, the relay UE may transmit, to the network device, fourth information indicating an ID (e.g., PagingUE-Identity, such as ng-5G-S-TMSI, full-RNTI) of the remote UE. The fourth information may be obtained from the remote UE via PC5-RRC signaling, or in a MAC CE or a control PDU of an SDAP, PDCP, RLC or adaptation layer. When the remote UE has reselected another relay, when the remote UE has reselected a direct link with the network device, or when the relay UE has transitioned to a different state than the RRC_CONNECTED state, the relay UE may notify the network device to release the fourth information.

In an example, the relay UE may receive from the network device a first paging message for paging the remote UE, e.g., via dedicated RRC signaling, RRC signaling, MAC CE, or L1 control signaling (e.g., PDCCH), and transmit, to the remote, a second paging message for paging the remote UE based on the first paging message, e.g., via PC5-RRC signaling, or in a MAC CE or a control PDU of an SDAP, PDCP, RLC or adaptation layer. For example, if the remote UE is in an inactive state over the sidelink when the relay UE receives the first paging message, the relay UE may wait for the next time occasion when the remote UE becomes active in order to transmit the second paging information. The remote UE and the relay UE may negotiate about specific time occasions over the sidelink for transmitting/receiving the second paging message. These time occasions may be configured using a sidelink paging DRX configuration.

In an example, e.g., as a response to the second paging message, the relay UE may receive from the remote UE a request for establishment or resumption of a connection with the network device by: initiating a RACH procedure with the network device, transmitting an RRC message to the network device, transmitting a MAC CE to the network device, or transmitting a PUCCH to the network device. Here, a message in the RACH procedure can indicate that the RACH procedure is for the remote UE to establish or resume the connection with the network device. For example, Msg1 in 4-step RACH procedure or MsgA in 2-step RACH procedure may indicate that the RACH procedure is for the remote UE to establish or resume the connection with the network device. Alternatively, an indicator may be included in e.g., Message 3 (Msg3) in 4-step RACH procedure or MsgA payload in 2-step RACH procedure to indicate that the RACH procedure is for the remote UE to establish or resume the connection with the network device. The indicator may alternatively be carried in a MAC CE, a MAC subheader or an RRC message. A PRACH preamble or resource (e.g., occasions) used in the RACH procedure can indicate that the RACH procedure is for the remote UE to establish or resume the connection with the network device (e.g., specific PRACH preambles or resources may be configured for respective remote UEs). The RRC message can indicate a request from the remote UE to establish or resume the connection with the network device. The MAC CE can indicate a request from the remote UE to establish or resume the connection with the network device. A resource of the PUCCH may indicate that the PUCCH is for the remote UE to establish or resume the connection with the network device (e.g., specific PUCCH resources (frequency/time) may be configured for respective remote UEs).

Figure 5:
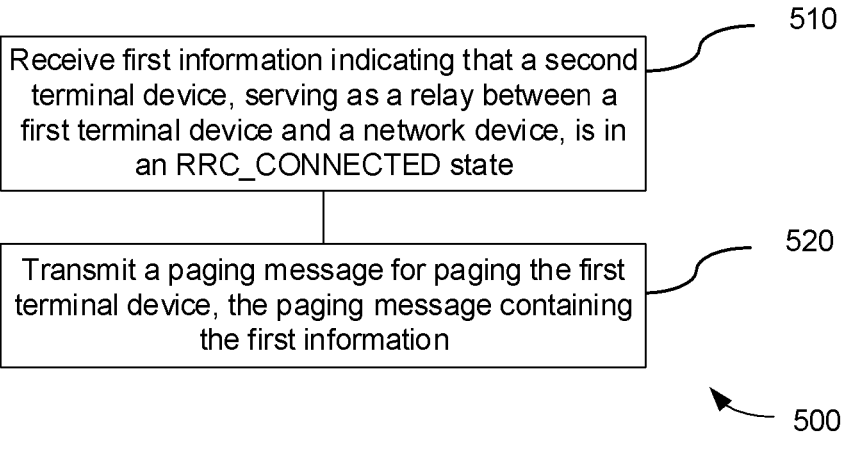
FIG. 5 is a flowchart illustrating a method in a core network node according to an embodiment of the present disclosure.

FIG. 5 is a flowchart illustrating a method 500 according to an embodiment of the present disclosure. The method 500 can be performed at a core network node, e.g., a serving AMF node of a first terminal device (referred to as remote UE hereinafter), e.g., Remote UE in FIGS. 1A, 1B, and 2. The first terminal device can communicate with a second terminal device (referred to as relay UE hereinafter), e.g., UE-to-Network Relay UE or L2 Relay UE in FIGS. 1A, 1B, and 2, over a sidelink (PC5). Accordingly, the relay UE serves as a relay between the remote UE and a network device (e.g., a gNB, which can be a serving gNB of the relay UE). The remote UE may be in an RRC_IDLE or RRC_INACTIVE state, and the relay UE may be in an RRC_CONNECTED state.

At block 510, first information is received, indicating that the relay UE is in the RRC_CONNECTED state. The first information may be received e.g., in a NAS message originated from the remote UE and forwarded by the relay UE, or may be received from a serving AMF node of the relay UE, as described above.

At block 520, a paging message for paging the remote UE is transmitted. The paging message contains the first information.

For example, in the case of CN-initiated paging, the core network node can determine from the received first information that the remote UE is linked to a relay UE that is in the RRC_CONNECTED state, and transmit the paging message (containing the first information) to a plurality of network devices (e.g., gNBs) within a paging area. Here, the paging message may be transmitted only to those gNBs that are capable of supporting sidelink communications. When a gNB receives the paging message, it determines from the first information that the paging message is for paging a remote UE linked to a relay UE in RRC_CONNECTED. If the gNB is currently serving at least one relay UE that is in RRC_CONNECTED, the gNB can inform each of relay UEs in RRC_CONNECTED, e.g., using a dedicated RRC message, that the remote UE needs to be reached. The dedicated RRC message may contain PagingUE-Identity of the remote UE. Each of these relay UEs can then determine, based on the PagingUE-Identity, whether the remote UE is linked to it. The relay UE to which the remote UE is linked can inform the remote UE to establish or resume an RRC connection with the gNB.

In an example, in addition to the first information, the core network node may receive second information indicating an ID of the network device. When the core network node knows the serving gNB of the relay UE from the second information, it can transmit the paging message (containing the first information) to the gNB only. The gNB can inform each of relay UEs in RRC_CONNECTED, e.g., using a dedicated RRC message, that the remote UE needs to be reached. The dedicated RRC message may contain PagingUE-Identity of the remote UE. Each of these relay UEs can then determine, based on the PagingUE-Identity, whether the remote UE is linked to it. The relay UE to which the remote UE is linked can inform the remote UE to establish or resume an RRC connection with the gNB.

In an example, in addition to the first information, the core network node may receive third information indicating an ID of the relay UE and the paging message may further contain the third information. When the core network node knows the ID of the relay UE from the third information, it can transmit the paging message (containing the first information and the third information) to a plurality of network devices (e.g., gNBs) within a paging area. Again, the paging message may be transmitted only to those gNBs that are capable of supporting sidelink communications. When a gNB receives the paging message, it determines from the first information that the paging message is for paging a remote UE linked to the particular relay UE. If the gNB is currently serving the relay UE, the gNB can inform the relay UE, e.g., using a dedicated RRC message, that the remote UE needs to be reached. The dedicated RRC message may contain PagingUE-Identity of the remote UE. The relay UE can then inform the remote UE to establish or resume an RRC connection with the gNB.

If the core network node receives all the first information, the second information, and the third information, it can transmit the paging message (containing the first information and the third information) to the serving gNB of the relay UE only. The gNB can inform the relay UE, e.g., using a dedicated RRC message, that the remote UE needs to be reached. The dedicated RRC message may contain PagingUE-Identity of the remote UE. The relay UE can then inform the remote UE to establish or resume an RRC connection with the gNB.

The principles of the present disclosure are also applicable to the case of RAN-initiated paging, where a paging event for a remote UE is triggered by a RAN node (e.g., the last serving gNB of the remote UE). In case the remote UE is linked to a relay UE in RRC_CONNECTED, the remote UE can inform the relay UE of the ID of the last serving gNB of the remote UE, and the relay UE can in turn transmit the ID to its own serving gNB. The serving gNB of the relay UE can then notify the last serving gNB of the remote UE that the remote UE can be reached via the serving gNB of the relay UE. The last serving gNB of the remote UE can then transmit a paging message for paging the remote UE only to the serving gNB of the relay UE, which can in turn reach the remote UE via the relay UE.

Figure 6:
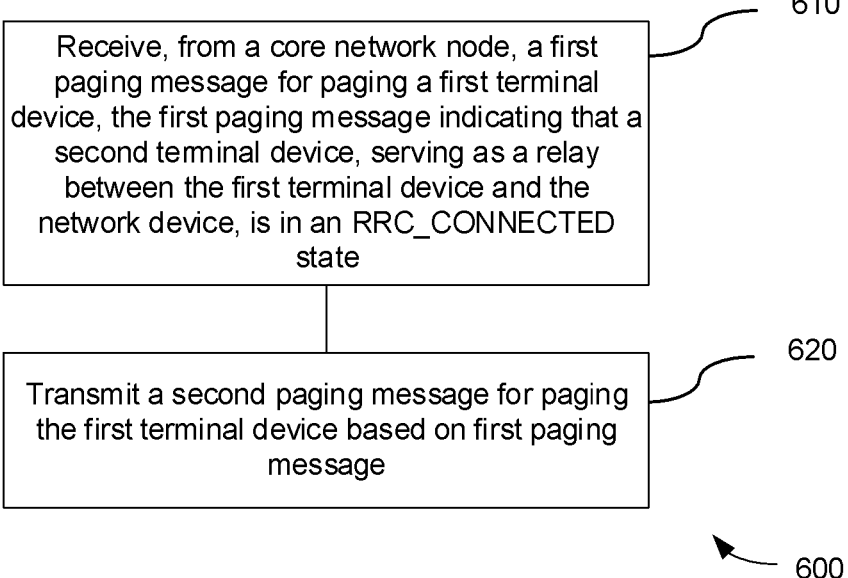
FIG. 6 is a flowchart illustrating a method in a network device according to an embodiment of the present disclosure.

FIG. 6 is a flowchart illustrating a method 600 according to an embodiment of the present disclosure. The method 600 can be performed at a network device, e.g., a gNB, which can be a serving gNB of a second terminal device (referred to as relay UE hereinafter), e.g., UE-to-Network Relay UE or L2 Relay UE in FIGS. 1A, 1B, and 2. The second terminal device can communicate with a first terminal device (referred to as remote UE hereinafter), e.g., Remote UE in FIGS. 1A, 1B, and 2, over a sidelink (PC5). Accordingly, the relay UE serves as a relay between the remote UE and the network device. The remote UE may be in an RRC_IDLE or RRC_INACTIVE state, and the relay UE may be in an RRC_CONNECTED state.

At block 610, a first paging message for paging the remote UE is received from a core network node (e.g., a serving AMF node of the remote UE). The first paging message indicates that the relay UE is in the RRC_CONNECTED state.

At block 620, a second paging message for paging the remote UE is transmitted based on the first paging message. Here, the second paging message can be transmitted e.g., via dedicated RRC signaling, RRC signaling, MAC CE, or L1 control signaling (e.g., PDCCH).

In an example, in the block 620, the second paging message can be transmitted to one or more terminal devices each serving as a relay and being in the RRC_CONNECTED state (including the relay UE).

In an example, the first paging message may further indicate an ID of the relay UE. In this case, the network device can transmit the second paging message to the relay UE only.

In an example, the network device may receive, from the relay UE, information indicating an ID (e.g., PagingUE-Identity, such as ng-5G-S-TMSI, full-RNTI) of the remote UE. In this case, the network device can determine to which relay UE the remote UE is linked, based on the PagingUE-Identity of the remote UE, and then inform the relay UE, e.g., using a dedicated RRC message, that the remote UE needs to be reached. The dedicated RRC message may include the PagingUE-Identity of the remote UE. The relay UE can then inform the remote UE to establish or resume an RRC connection with the network device.

In an example, the network device may receive from the relay UE a RACH message, an RRC message, a MAC CE, or a PUCCH. Here, For example, Msg1 in 4-step RACH procedure or MsgA in 2-step RACH procedure may indicate that the RACH message is for the remote UE to establish or resume the connection with the network device. Alternatively, an indicator may be included in e.g., Msg3 in 4-step RACH procedure or MsgA payload in 2-step RACH procedure to indicate that the RACH procedure is for the remote UE to establish or resume the connection with the network device. The indicator may alternatively be carried in a MAC CE, a MAC subheader or an RRC message. A PRACH preamble or resource (e.g., occasions) used for the RACH message can indicate that the RACH procedure is for the remote UE to establish or resume the connection with the network device (e.g., specific PRACH preambles or resources may be configured for respective remote UEs). The RRC message can indicate a request from the remote UE to establish or resume the connection with the network device. The MAC CE can indicate a request from the remote UE to establish or resume the connection with the network device. A resource of the PUCCH may indicate that the PUCCH is for the remote UE to establish or resume the connection with the network device (e.g., specific PUCCH resources (frequency/time) may be configured for respective remote UEs).

Figure 7:
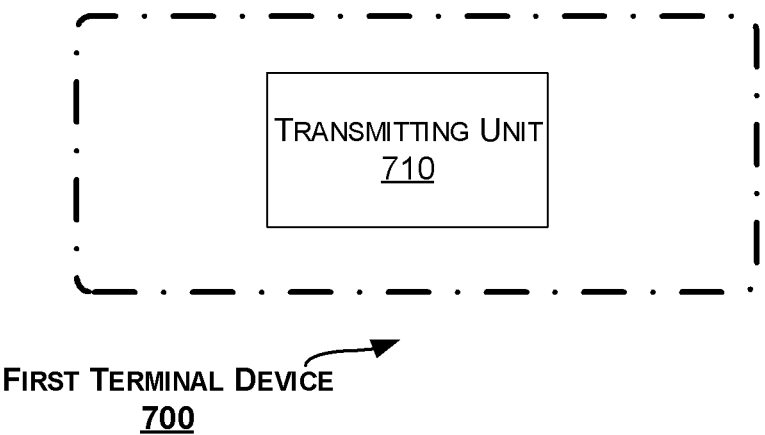
FIG. 7 is a block diagram of a first terminal device according to an embodiment of the present disclosure.

Correspondingly to the method 300 as described above, a first terminal device is provided. FIG. 7 is a block diagram of a first terminal device 700 according to an embodiment of the present disclosure.

As shown in FIG. 7, the first terminal device 700 includes a transmitting unit 710 configured to transmit, to a core network node, first information indicating that a second terminal device, serving as a relay between the first terminal device and a network device, is in an RRC_CONNECTED state.

In an embodiment, the transmitting unit 710 can be further configured to transmit, to the core network node, second information indicating an ID of the network device and/or third information indicating an ID of the second terminal device.

In an embodiment, the ID of the second terminal device may include a C-RNTI or an ng-5G-S-TMSI of the second terminal device.

In an embodiment, the first information, the second information, and/or the third information may be obtained from the second terminal device via PC5-RRC signaling, or in a MAC CE, or a control PDU of an SDAP, PDCP, RLC, or adaptation layer.

In an embodiment, the first information, the second information, and/or the third information may be transmitted to the core network node via the second terminal device.

In an embodiment, the first information, the second information, and/or the third information may be included in a message destined to the core network node. Alternatively, the first information, the second information, and/or the third information may be included in a message terminated at the second terminal device for forwarding to the core network node, and the message may contain an ID of the core network node.

In an embodiment, the first terminal device 700 can further include a notifying unit configured to notify the core network node to release the first information, the second information, and/or the third information when the first terminal device has reselected another relay that is not in the RRC_CONNECTED state, when the first terminal device has reselected a direct link with the network device, or when the second terminal device has transitioned to a different state than the RRC_CONNECTED state.

In an embodiment, the core network node may be a serving AMF node of the first terminal device.

In an embodiment, the network device may be a serving gNB of the second terminal device.

In an embodiment, the first terminal device may be in an RRC_IDLE or RRC_INACTIVE state.

In an embodiment, the first terminal device and the second terminal device may communicate with each other over a sidelink.

In an embodiment, the first terminal device 700 can further include: a receiving unit configured to receive, from the second terminal device, a paging message for paging the first terminal device; and an initiating unit configured to initiate, in response to the paging message, establishment or resumption of a connection with the network device via the second terminal device.

In an embodiment, the paging message may be received via PC5-RRC signaling, or in a MAC CE or a control PDU of an SDAP, PDCP, RLC or adaptation layer.

In an embodiment, the initiating unit can be configured to initiate a RACH procedure with the network device via the second terminal device, transmitting an RRC message to the network device via the second terminal device, transmitting a MAC CE to the network device via the second terminal device, or transmitting a PUCCH to the network device via the second terminal device.

In an embodiment, a message in the RACH procedure or a PRACH preamble or resource used in the RACH procedure may indicate that the RACH procedure is for the first terminal device to establish or resume the connection with the network device. The RRC message may indicate a request from the first terminal device to establish or resume the connection with the network device. The MAC CE may indicate a request from the first terminal device to establish or resume the connection with the network device. A resource of the PUCCH may indicate that the PUCCH is for the first terminal device to establish or resume the connection with the network device.

The transmitting unit 710 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 3.

Figure 8:
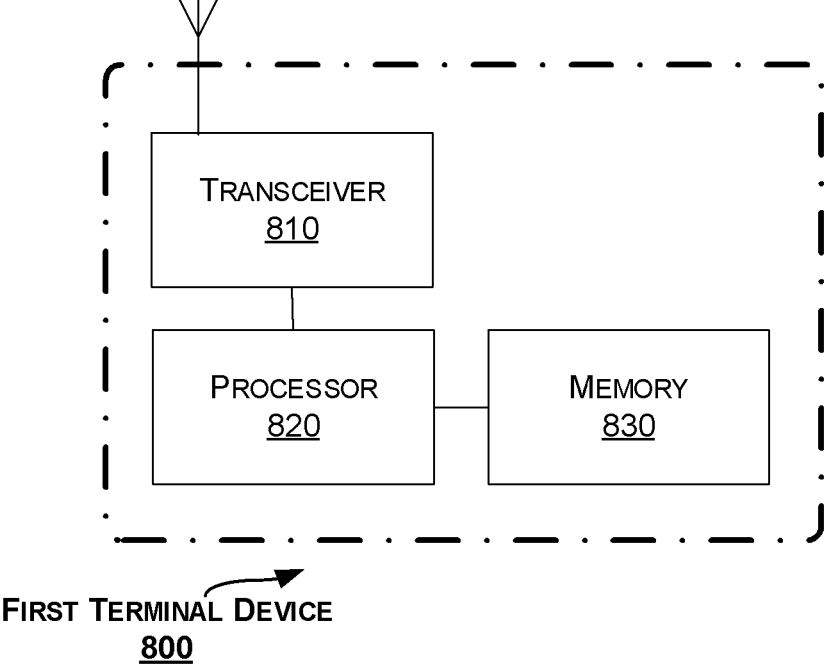
FIG. 8 is a block diagram of a first terminal device according to another embodiment of the present disclosure.

FIG. 8 is a block diagram of a first terminal device 800 according to another embodiment of the present disclosure.

The first terminal device 800 includes a transceiver 810, a processor 820 and a memory 830. The memory 830 can contain instructions executable by the processor 820 whereby the first terminal device 800 is operative to perform the actions, e.g., of the procedure described earlier in conjunction with FIG. 3. Particularly, the memory 830 contains instructions executable by the processor 820 whereby the first terminal device 800 is operative to: transmit, to a core network node, first information indicating that a second terminal device, serving as a relay between the first terminal device and a network device, is in an RRC_CONNECTED state.

In an embodiment, the memory 830 may further contain instructions executable by the processor 820 whereby the first terminal device 800 is operative to: transmit, to the core network node, second information indicating an ID of the network device and/or third information indicating an ID of the second terminal device.

In an embodiment, the ID of the second terminal device may include a C-RNTI or an ng-5G-S-TMSI of the second terminal device.

In an embodiment, the first information, the second information, and/or the third information may be obtained from the second terminal device via PC5-RRC signaling, or in a MAC CE, or a control PDU of an SDAP, PDCP, RLC, or adaptation layer.

In an embodiment, the first information, the second information, and/or the third information may be transmitted to the core network node via the second terminal device.

In an embodiment, the first information, the second information, and/or the third information may be included in a message destined to the core network node. Alternatively, the first information, the second information, and/or the third information may be included in a message terminated at the second terminal device for forwarding to the core network node, and the message may contain an ID of the core network node.

In an embodiment, the memory 830 may further contain instructions executable by the processor 820 whereby the first terminal device 800 is operative to: notify the core network node to release the first information, the second information, and/or the third information when the first terminal device has reselected another relay that is not in the RRC_CONNECTED state, when the first terminal device has reselected a direct link with the network device, or when the second terminal device has transitioned to a different state than the RRC_CONNECTED state.

In an embodiment, the core network node may be a serving AMF node of the first terminal device.

In an embodiment, the network device may be a serving gNB of the second terminal device.

In an embodiment, the first terminal device may be in an RRC_IDLE or RRC_INACTIVE state.

In an embodiment, the first terminal device and the second terminal device may communicate with each other over a sidelink.

In an embodiment, the memory 830 may further contain instructions executable by the processor 820 whereby the first terminal device 800 is operative to: receive, from the second terminal device, a paging message for paging the first terminal device; and initiating, in response to the paging message, establishment or resumption of a connection with the network device via the second terminal device.

In an embodiment, the paging message may be received via PC5-RRC signaling, or in a MAC CE or a control PDU of an SDAP, PDCP, RLC or adaptation layer.

In an embodiment, the operation of initiating may include: initiating a RACH procedure with the network device via the second terminal device, transmitting an RRC message to the network device via the second terminal device, transmitting a MAC CE to the network device via the second terminal device, or transmitting a PUCCH to the network device via the second terminal device.

In an embodiment, a message in the RACH procedure or a PRACH preamble or resource used in the RACH procedure may indicate that the RACH procedure is for the first terminal device to establish or resume the connection with the network device. The RRC message may indicate a request from the first terminal device to establish or resume the connection with the network device. The MAC CE may indicate a request from the first terminal device to establish or resume the connection with the network device. A resource of the PUCCH may indicate that the PUCCH is for the first terminal device to establish or resume the connection with the network device.

Figure 9:
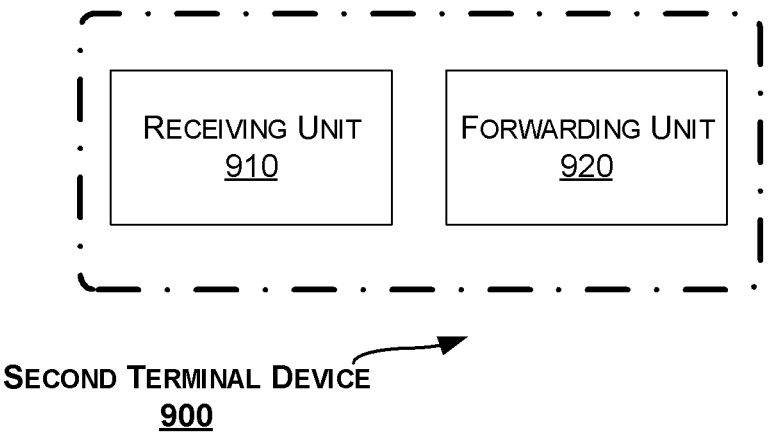
FIG. 9 is a block diagram of a second terminal device according to an embodiment of the present disclosure.

Correspondingly to the method 400 as described above, a second terminal device is provided. FIG. 9 is a block diagram of a second terminal device 900 according to an embodiment of the present disclosure. The second terminal device 900 serves as a relay between the first terminal device and a network device.

As shown in FIG. 9, the second terminal device 900 includes a receiving unit 910 configured to receive, from the first terminal device, first information indicating that the second terminal device is in an RRC_CONNECTED state. The second terminal device 900 further includes a forwarding unit 920 configured to forward the first information to a core network node.

In an embodiment, the receiving unit 910 can be further configured to receive, from the first terminal device, second information indicating an ID of the network device and/or third information indicating an ID of the second terminal device. The forwarding unit 910 can be further configured to forward the second information and/or the third information to the core network node.

In an embodiment, the ID of the second terminal device may include a C-RNTI or an ng-5G-S-TMSI of the second terminal device.

In an embodiment, the second terminal device 900 can further include a transmitting unit configured to transmit the first information, the second information, and/or the third information to the first terminal device via PC5-RRC signaling, or in a MAC CE or a control PDU of an SDAP, PDCP, RLC, or adaptation layer.

In an embodiment, the first information, the second information, and/or the third information may be included in a message destined to the core network node, and may be forwarded to the core network node transparently. Alternatively, the first information, the second information, and/or the third information may be included in a message terminated at the second terminal device, the message containing an ID of the core network node, and may be forwarded to a serving core network node of the second terminal device for further forwarding to the core network node.

In an embodiment, the receiving unit 910 can be further configured to receive, from the first terminal device, a notification to release the first information, the second information, and/or the third information when the first terminal device has reselected another relay that is not in the RRC_CONNECTED state, when the first terminal device has reselected a direct link with the network device, or when the second terminal device has transitioned to a different state than the RRC_CONNECTED state. The forwarding unit 910 can be further configured to forward the notification to the core network node.

In an embodiment, the core network node may be a serving AMF node of the first terminal device.

In an embodiment, the network device may be a serving gNB of the second terminal device.

In an embodiment, the second terminal device 900 can further include a transmitting unit configured to transmit, to the network device, fourth information indicating an ID of the first terminal device.

In an embodiment, the fourth information may be obtained from the first terminal device via PC5-RRC signaling, or in a MAC CE or a control PDU of an SDAP, PDCP, RLC or adaptation layer.

In an embodiment, the second terminal device 900 can further include a notifying unit configured to notify the network device to release the fourth information when the first terminal device has reselected another relay, when the first terminal device has reselected a direct link with the network device, or when the second terminal device has transitioned to a different state than the RRC_CONNECTED state.

In an embodiment, the first terminal device may be in an RRC_IDLE or RRC_INACTIVE state.

In an embodiment, the first terminal device and the second terminal device may communicate with each other over a sidelink.

In an embodiment, the receiving unit 910 can be further configured to receive, from the network device, a first paging message for paging the first terminal device. The second terminal device 900 can further include a transmitting unit configured to transmit, to the first terminal device, a second paging message for paging the first terminal device based on the first paging message.

In an embodiment, the first paging message may be received via dedicated RRC signaling, RRC signaling, MAC CE, or L1 control signaling.

In an embodiment, the second paging message may be transmitted via PC5-RRC signaling, or in a MAC CE or a control PDU of an SDAP, PDCP, RLC or adaptation layer.

In an embodiment, the receiving unit 910 can be further configured to: receive, from the first terminal device, a request for establishment or resumption of a connection with the network device by: initiating an RACH procedure with the network device, transmitting an RRC message to the network device, transmitting a MAC CE to the network device, or transmitting a PUCCH to the network device.

In an embodiment, a message in the RACH procedure or a PRACH preamble or resource used in the RACH procedure may indicate that the RACH procedure is for the first terminal device to establish or resume the connection with the network device. The RRC message may indicate a request from the first terminal device to establish or resume the connection with the network device. The MAC CE may indicate a request from the first terminal device to establish or resume the connection with the network device. A resource of the PUCCH may indicate that the PUCCH is for the first terminal device to establish or resume the connection with the network device.

The receiving unit 910 and the forwarding unit 920 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 4.

Figure 10:
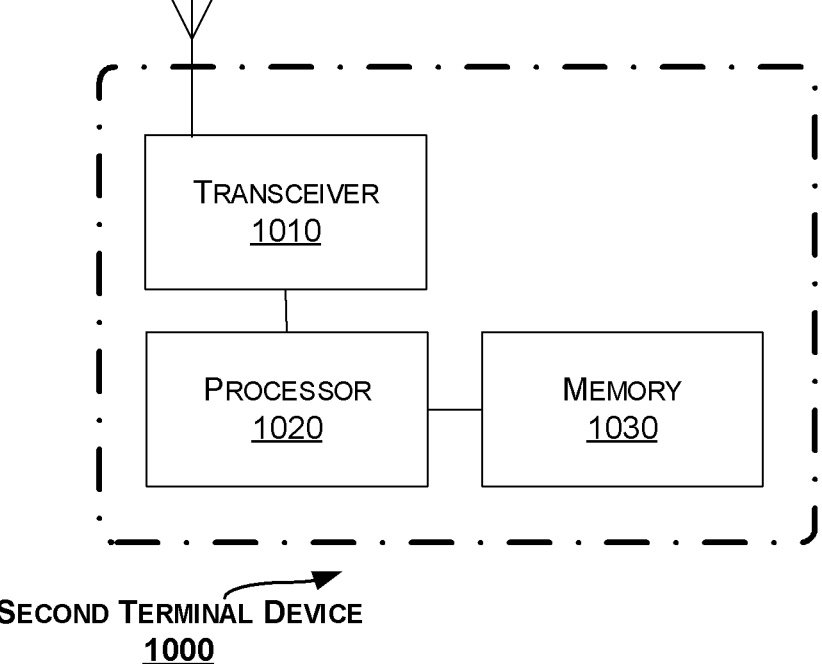
FIG. 10 is a block diagram of a second terminal device according to another embodiment of the present disclosure.

FIG. 10 is a block diagram of a second terminal device 1000 according to another embodiment of the present disclosure.

The second terminal device 1000 includes a transceiver 1010, a processor 1020 and a memory 1030. The memory 1030 can contain instructions executable by the processor 1020 whereby the second terminal device 1000 is operative to perform the actions, e.g., of the procedure described earlier in conjunction with FIG. 4. Particularly, the memory 1030 contains instructions executable by the processor 1020 whereby the second terminal device 1000 is operative to: receive, from the first terminal device, first information indicating that the second terminal device is in an RRC_CONNECTED state; and forward the first information to a core network node.

In an embodiment, the memory 1030 may further contain instructions executable by the processor 1020 whereby the second terminal device 1000 is operative to: receive, from the first terminal device, second information indicating an ID of the network device and/or third information indicating an ID of the second terminal device; and forward the second information and/or the third information to the core network node.

In an embodiment, the ID of the second terminal device may include a C-RNTI or an ng-5G-S-TMSI of the second terminal device.

In an embodiment, the memory 1030 may further contain instructions executable by the processor 1020 whereby the second terminal device 1000 is operative to: transmit the first information, the second information, and/or the third information to the first terminal device via PC5-RRC signaling, or in a MAC CE or a control PDU of an SDAP, PDCP, RLC, or adaptation layer.

In an embodiment, the first information, the second information, and/or the third information may be included in a message destined to the core network node, and may be forwarded to the core network node transparently. Alternatively, the first information, the second information, and/or the third information may be included in a message terminated at the second terminal device, the message containing an ID of the core network node, and may be forwarded to a serving core network node of the second terminal device for further forwarding to the core network node.

In an embodiment, the memory 1030 may further contain instructions executable by the processor 1020 whereby the second terminal device 1000 is operative to: receive, from the first terminal device, a notification to release the first information, the second information, and/or the third information when the first terminal device has reselected another relay that is not in the RRC_CONNECTED state, when the first terminal device has reselected a direct link with the network device, or when the second terminal device has transitioned to a different state than the RRC_CONNECTED state; and forward the notification to the core network node.

In an embodiment, the core network node may be a serving AMF node of the first terminal device.

In an embodiment, the network device may be a serving gNB of the second terminal device.

In an embodiment, the memory 1030 may further contain instructions executable by the processor 1020 whereby the second terminal device 1000 is operative to: transmit, to the network device, fourth information indicating an ID of the first terminal device.

In an embodiment, the fourth information may be obtained from the first terminal device via PC5-RRC signaling, or in a MAC CE or a control PDU of an SDAP, PDCP, RLC or adaptation layer.

In an embodiment, the memory 1030 may further contain instructions executable by the processor 1020 whereby the second terminal device 1000 is operative to: notify the network device to release the fourth information when the first terminal device has reselected another relay, when the first terminal device has reselected a direct link with the network device, or when the second terminal device has transitioned to a different state than the RRC_CONNECTED state.

In an embodiment, the first terminal device may be in an RRC_IDLE or RRC_INACTIVE state.

In an embodiment, the first terminal device and the second terminal device may communicate with each other over a sidelink.

In an embodiment, the memory 1030 may further contain instructions executable by the processor 1020 whereby the second terminal device 1000 is operative to: receive, from the network device, a first paging message for paging the first terminal device; and transmit, to the first terminal device, a second paging message for paging the first terminal device based on the first paging message.

In an embodiment, the first paging message may be received via dedicated RRC signaling, RRC signaling, MAC CE, or L1 control signaling.

In an embodiment, the second paging message may be transmitted via PC5-RRC signaling, or in a MAC CE or a control PDU of an SDAP, PDCP, RLC or adaptation layer.

In an embodiment, the memory 1030 may further contain instructions executable by the processor 1020 whereby the second terminal device 1000 is operative to: receive, from the first terminal device, a request for establishment or resumption of a connection with the network device by:

initiating an RACH procedure with the network device, transmitting an RRC message to the network device, transmitting a MAC CE to the network device, or transmitting a PUCCH to the network device.

In an embodiment, a message in the RACH procedure or a PRACH preamble or resource used in the RACH procedure may indicate that the RACH procedure is for the first terminal device to establish or resume the connection with the network device. The RRC message may indicate a request from the first terminal device to establish or resume the connection with the network device. The MAC CE may indicate a request from the first terminal device to establish or resume the connection with the network device. A resource of the PUCCH may indicate that the PUCCH is for the first terminal device to establish or resume the connection with the network device.

Figure 11:
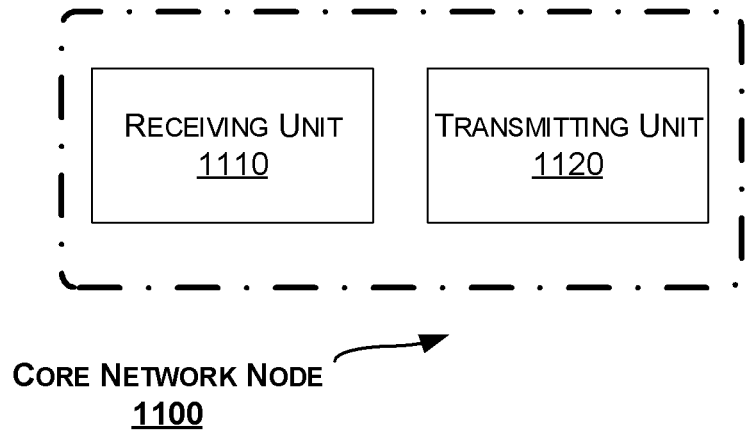
FIG. 11 is a block diagram of a core network node according to an embodiment of the present disclosure.

Correspondingly to the method 500 as described above, a core network node is provided. FIG. 11 is a block diagram of a core network node 1100 according to an embodiment of the present disclosure.

As shown in FIG. 11, the core network node 1100 includes a receiving unit 1110 configured to receive first information indicating that a second terminal device, serving as a relay between a first terminal device and a network device, is in an RRC_CONNECTED state. The core network node 1100 further includes a transmitting unit 1120 configured to transmit a paging message for paging the first terminal device, the paging message containing the first information.

In an embodiment, the paging message may be transmitted to a plurality of network devices within a paging area.

In an embodiment, the receiving unit 1110 can be further configured to receive second information indicating an ID of the network device. The paging message may be transmitted to the network device.

In an embodiment, the receiving unit 1110 can be further configured to receive third information indicating an ID of the second terminal device. The paging message may further contain the third information.

In an embodiment, the core network node may be a serving AMF node of the first terminal device.

In an embodiment, the network device may be a serving gNB of the second terminal device.

The receiving unit 1110 and the transmitting unit 1120 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 5.

Figure 12:
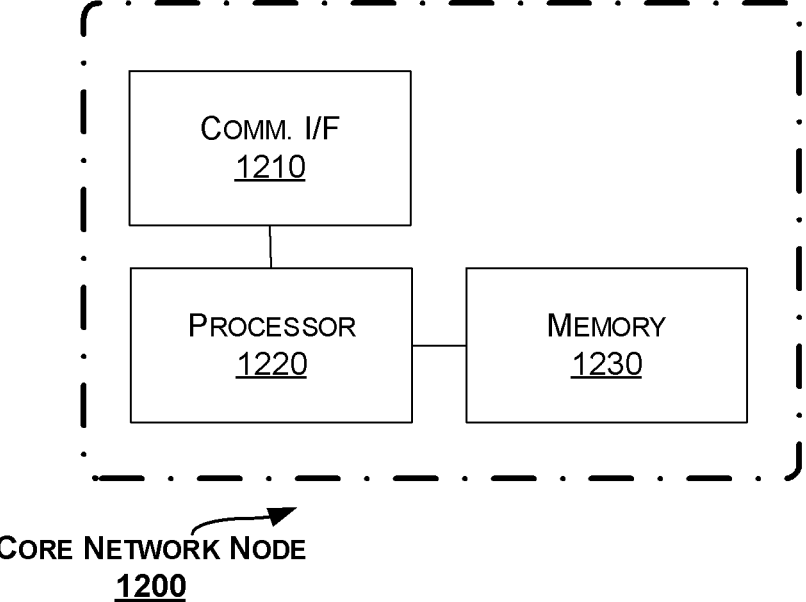
FIG. 12 is a block diagram of a core network node according to another embodiment of the present disclosure.

FIG. 12 is a block diagram of a core network node 1200 according to another embodiment of the present disclosure.

The core network node 1200 includes a communication interface 1210, a processor 1220 and a memory 1230. The memory 1230 can contain instructions executable by the processor 1220 whereby the core network node 1200 is operative to perform the actions, e.g., of the procedure described earlier in conjunction with FIG. 5. Particularly, the memory 1230 contains instructions executable by the processor 1220 whereby the core network node 1200 is operative to: receive first information indicating that a second terminal device, serving as a relay between a first terminal device and a network device, is in an RRC_CONNECTED state; and transmit a paging message for paging the first terminal device, the paging message containing the first information.

In an embodiment, the paging message may be transmitted to a plurality of network devices within a paging area.

In an embodiment, the memory 1230 may further contain instructions executable by the processor 1220 whereby the core network node 1200 is operative to: receive second information indicating an ID of the network device. The paging message may be transmitted to the network device.

In an embodiment, the memory 1230 may further contain instructions executable by the processor 1220 whereby the core network node 1200 is operative to: receive third information indicating an ID of the second terminal device. The paging message may further contain the third information.

In an embodiment, the core network node may be a serving AMF node of the first terminal device.

In an embodiment, the network device may be a serving gNB of the second terminal device.

Figure 13:
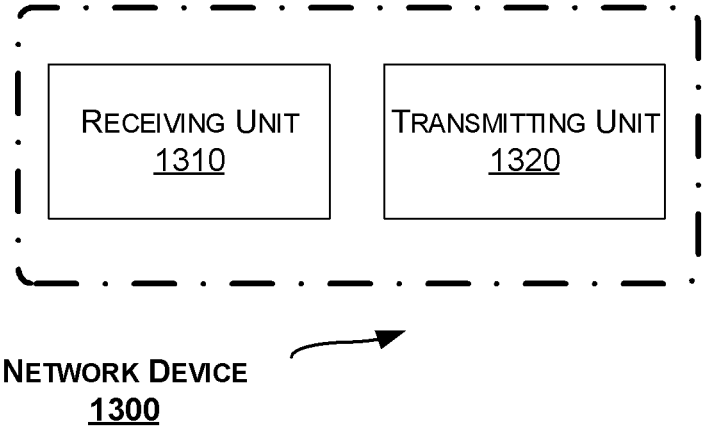
FIG. 13 is a block diagram of a network device according to an embodiment of the present disclosure.

Correspondingly to the method 600 as described above, a network device is provided. FIG. 13 is a block diagram of a network device 1300 according to an embodiment of the present disclosure.

As shown in FIG. 13, the network device 1300 includes a receiving unit 1310 configured to receive, from a core network node, a first paging message for paging a first terminal device, the first paging message indicating that a second terminal device, serving as a relay between the first terminal device and the network device, is in an RRC_CONNECTED state. The network device 1300 further includes a transmitting unit 1320 configured to transmit a second paging message for paging the first terminal device based on the first paging message.

In an embodiment, the second paging message may be transmitted to one or more terminal devices each serving as a relay and being in the RRC_CONNECTED state.

In an embodiment, the first paging message may further indicate an ID of the second terminal device, and the second paging message may be transmitted to the second terminal device.

In an embodiment, the receiving unit 1310 can be further configured to receive, from the second terminal device, information indicating an ID of the first terminal device. The second paging message may be transmitted to the second terminal device.

In an embodiment, the second paging message may be transmitted via dedicated RRC signaling, RRC signaling, MAC CE, or L1 control signaling.

In an embodiment, the receiving unit 1310 can be further configured to receive, from the second terminal device, a RACH message, an RRC message, a MAC CE, or a PUCCH. The RACH message or a PRACH preamble or resource used for the RACH message may indicate that the RACH message is for the first terminal device to establish or resume the connection with the network device.

The RRC message may indicate a request from the first terminal device to establish or resume the connection with the network device. The MAC CE may indicate a request from the first terminal device to establish or resume the connection with the network device. A resource of the PUCCH may indicate that the PUCCH is for the first terminal device to establish or resume the connection with the network device.

In an embodiment, the network device may be a serving gNB of the second terminal device.

The receiving unit 1310 and the transmitting unit 1320 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 6.

Figure 14:
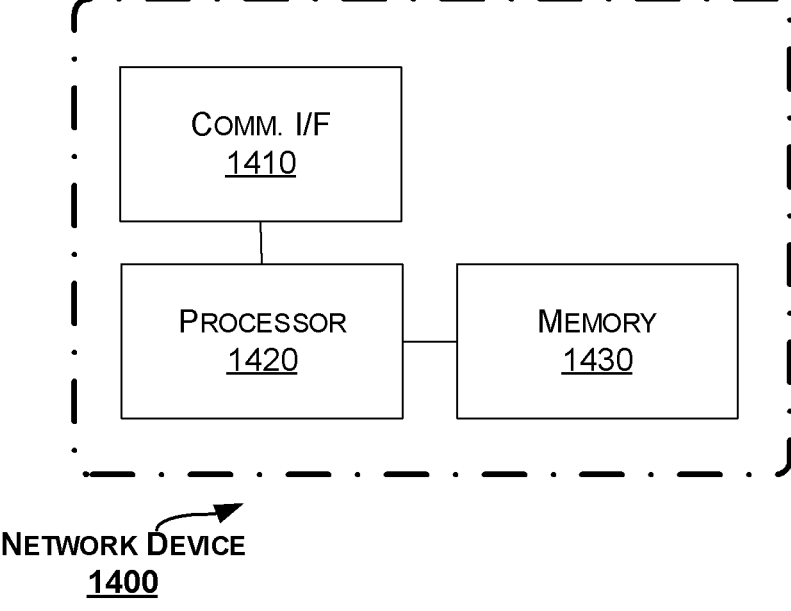
FIG. 14 is a block diagram of a network device according to another embodiment of the present disclosure.

FIG. 14 is a block diagram of a network device 1400 according to another embodiment of the present disclosure.

The network device 1400 includes a communication interface 1410, a processor 1420 and a memory 1430. The memory 1430 can contain instructions executable by the processor 1420 whereby the network device 1400 is operative to perform the actions, e.g., of the procedure described earlier in conjunction with FIG. 6. Particularly, the memory 1430 contains instructions executable by the processor 1420 whereby the network device 1400 is operative to: receive, from a core network node, a first paging message for paging a first terminal device, the first paging message indicating that a second terminal device, serving as a relay between the first terminal device and the network device, is in an RRC_CONNECTED state; and transmit a second paging message for paging the first terminal device based on the first paging message.

In an embodiment, the second paging message may be transmitted to one or more terminal devices each serving as a relay and being in the RRC_CONNECTED state.

In an embodiment, the first paging message may further indicate an ID of the second terminal device, and the second paging message may be transmitted to the second terminal device.

In an embodiment, the memory 1430 may further contain instructions executable by the processor 1420 whereby the network device 1400 is operative to: receive, from the second terminal device, information indicating an ID of the first terminal device. The second paging message may be transmitted to the second terminal device.

In an embodiment, the second paging message may be transmitted via dedicated RRC signaling, RRC signaling, MAC CE, or L1 control signaling.

In an embodiment, the memory 1430 may further contain instructions executable by the processor 1420 whereby the network device 1400 is operative to: receive, from the second terminal device, a RACH message, an RRC message, a MAC CE, or a PUCCH. The RACH message or a PRACH preamble or resource used for the RACH message may indicate that the RACH message is for the first terminal device to establish or resume the connection with the network device. The RRC message may indicate a request from the first terminal device to establish or resume the connection with the network device. The MAC CE may indicate a request from the first terminal device to establish or resume the connection with the network device. A resource of the PUCCH may indicate that the PUCCH is for the first terminal device to establish or resume the connection with the network device.

In an embodiment, the network device may be a serving gNB of the second terminal device.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 820 causes the first terminal device 800 to perform the actions, e.g., of the procedure described earlier in conjunction with FIG. 3; or code/computer readable instructions, which when executed by the processor 1020 causes the second terminal device 1000 to perform the actions, e.g., of the procedure described earlier in conjunction with FIG. 4; or code/ computer readable instructions, which when executed by the processor 1220 causes the core network node 1200 to perform the actions, e.g., of the procedure described earlier in conjunction with FIG. 5; or code/computer readable instructions, which when executed by the processor 1420 causes the network device 1400 to perform the actions, e.g., of the procedure described earlier in conjunction with FIG. 6.

The computer program product may be configured as a computer program code structured in computer program modules. The computer program modules could essentially perform the actions of the flow illustrated in FIG. 3, 4, 5, or 6.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a non-transitory computer readable storage medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

Figure 15:
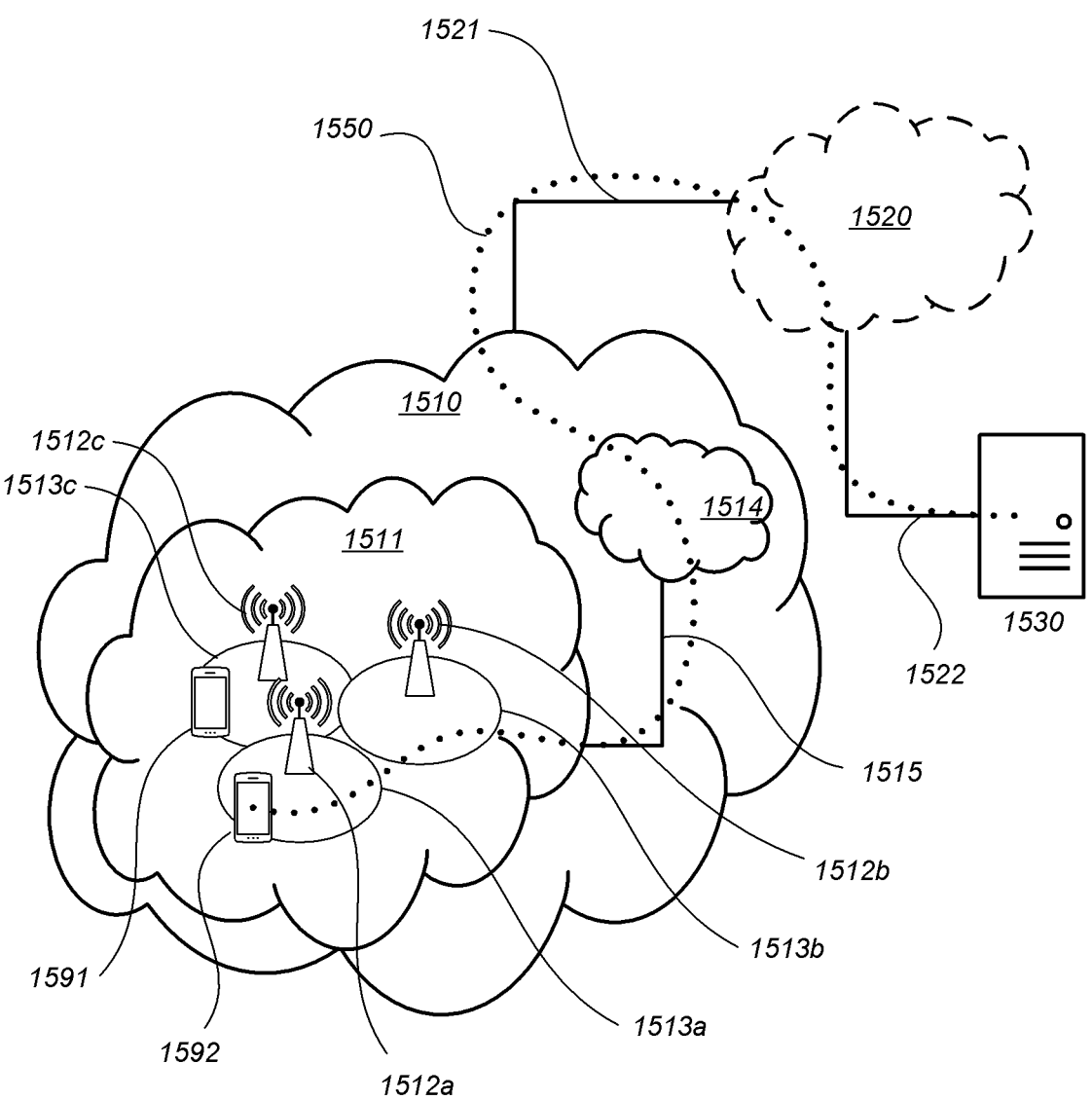
FIG. 15 schematically illustrates a telecommunication network connected via an intermediate network to a host computer.

With reference to FIG. 15, in accordance with an embodiment, a communication system includes a telecommunication network 1510, such as a 3GPP-type cellular network, which comprises an access network 1511, such as a radio access network, and a core network 1514. The access network 1511 comprises a plurality of base stations 1512a, 1512b, 1512c, such as NBs, eNBs, gNBs or other types of wireless access points, each defining a corresponding coverage area 1513a, 1513b, 1513c. Each base station 1512a, 1512b, 1512c is connectable to the core network 1514 over a wired or wireless connection 1515. A first user equipment (UE) 1591 located in coverage area 1513c is configured to wirelessly connect to, or be paged by, the corresponding base station 1512c. A second UE 1592 in coverage area 1513a is wirelessly connectable to the corresponding base station 1512a. While a plurality of UEs 1591, 1592 are illustrated in this example, the disclosed embodiments are equally applicable to a situation where a sole UE is in the coverage area or where a sole UE is connecting to the corresponding base station 1512.

The telecommunication network 1510 is itself connected to a host computer 1530, which may be embodied in the hardware and/or software of a standalone server, a cloud-implemented server, a distributed server or as processing resources in a server farm. The host computer 1530 may be under the ownership or control of a service provider, or may be operated by the service provider or on behalf of the service provider. The connections 1521, 1522 between the telecommunication network 1510 and the host computer 1530 may extend directly from the core network 1514 to the host computer 1530 or may go via an optional intermediate network 1520. The intermediate network 1520 may be one of, or a combination of more than one of, a public, private or hosted network; the intermediate network 1520, if any, may be a backbone network or the Internet; in particular, the intermediate network 1520 may comprise two or more sub-networks (not shown).

The communication system of FIG. 15 as a whole enables connectivity between one of the connected UEs 1591, 1592 and the host computer 1530. The connectivity may be described as an over-the-top (OTT) connection 1550. The host computer 1530 and the connected UEs 1591, 1592 are configured to communicate data and/or signaling via the OTT connection 1550, using the access network 1511, the core network 1514, any intermediate network 1520 and possible further infrastructure (not shown) as intermediaries. The OTT connection 1550 may be transparent in the sense that the participating communication devices through which the OTT connection 1550 passes are unaware of routing of uplink and downlink communications. For example, a base station 1512 may not or need not be informed about the past routing of an incoming downlink communication with data originating from a host computer 1530 to be forwarded (e.g., handed over) to a connected UE 1591. Similarly, the base station 1512 need not be aware of the future routing of an outgoing uplink communication originating from the UE 1591 towards the host computer 1530.

Example implementations, in accordance with an embodiment, of the UE, base station and host computer discussed in the preceding paragraphs will now be described with reference to FIG. 16. In a communication system 1600, a host computer 1610 comprises hardware 1615 including a communication interface 1616 configured to set up and maintain a wired or wireless connection with an interface of a different communication device of the communication system 1600. The host computer 1610 further comprises processing circuitry 1618, which may have storage and/or processing capabilities. In particular, the processing circuitry 1618 may comprise one or more programmable processors, application-specific integrated circuits, field programmable gate arrays or combinations of these (not shown) adapted to execute instructions. The host computer 1610 further comprises software 1611, which is stored in or accessible by the host computer 1610 and executable by the processing circuitry 1618. The software 1611 includes a host application 1612. The host application 1612 may be operable to provide a service to a remote user, such as a UE 1630 connecting via an OTT connection 1650 terminating at the UE 1630 and the host computer 1610. In providing the service to the remote user, the host application 1612 may provide user data which is transmitted using the OTT connection 1650.

The communication system 1600 further includes a base station 1620 provided in a telecommunication system and comprising hardware 1625 enabling it to communicate with the host computer 1610 and with the UE 1630. The hardware 1625 may include a communication interface 1626 for setting up and maintaining a wired or wireless connection with an interface of a different communication device of the communication system 1600, as well as a radio interface 1627 for setting up and maintaining at least a wireless connection 1670 with a UE 1630 located in a coverage area (not shown in FIG. 16) served by the base station 1620. The communication interface 1626 may be configured to facilitate a connection 1660 to the host computer 1610. The connection 1660 may be direct or it may pass through a core network (not shown in FIG. 16) of the telecommunication system and/or through one or more intermediate networks outside the telecommunication system. In the embodiment shown, the hardware 1625 of the base station 1620 further includes processing circuitry 1628, which may comprise one or more programmable processors, application-specific integrated circuits, field programmable gate arrays or combinations of these (not shown) adapted to execute instructions. The base station 1620 further has software 1621 stored internally or accessible via an external connection.

The communication system 1600 further includes the UE 1630 already referred to. Its hardware 1635 may include a radio interface 1637 configured to set up and maintain a wireless connection 1670 with a base station serving a coverage area in which the UE 1630 is currently located. The hardware 1635 of the UE 1630 further includes processing circuitry 1638, which may comprise one or more programmable processors, application-specific integrated circuits, field programmable gate arrays or combinations of these (not shown) adapted to execute instructions. The UE 1630 further comprises software 1631, which is stored in or accessible by the UE 1630 and executable by the processing circuitry 1638. The software 1631 includes a client application 1632. The client application 1632 may be operable to provide a service to a human or non-human user via the UE 1630, with the support of the host computer 1610. In the host computer 1610, an executing host application 1612 may communicate with the executing client application 1632 via the OTT connection 1650 terminating at the UE 1630 and the host computer 1610. In providing the service to the user, the client application 1632 may receive request data from the host application 1612 and provide user data in response to the request data. The OTT connection 1650 may transfer both the request data and the user data. The client application 1632 may interact with the user to generate the user data that it provides.

Figure 16:
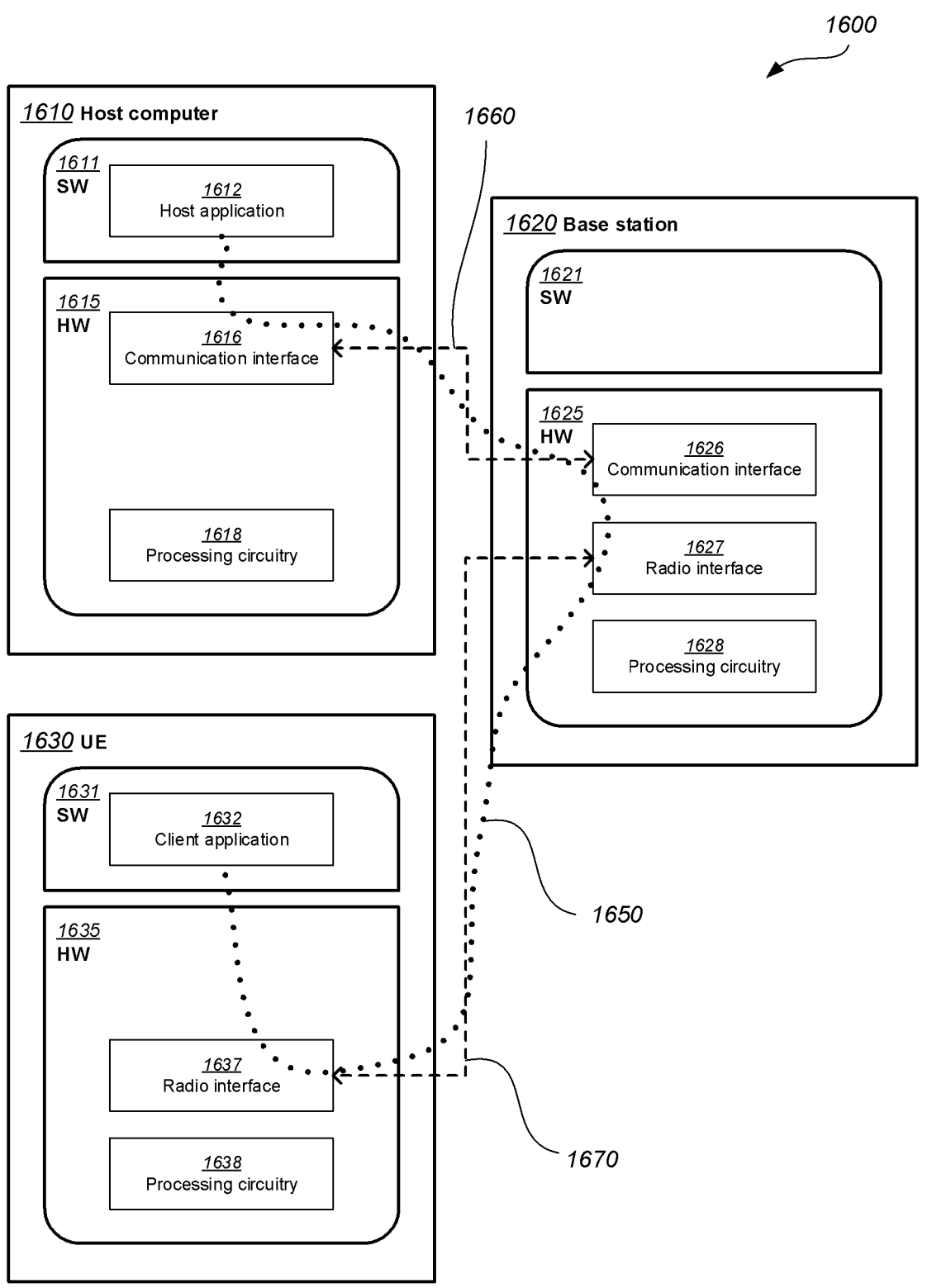
FIG. 16 is a generalized block diagram of a host computer communicating via a base station with a user equipment over a partially wireless connection.

It is noted that the host computer 1610, base station 1620 and UE 1630 illustrated in FIG. 16 may be identical to the host computer 1530, one of the base stations 1512*a*, 1512*b*, 1512*c* and one of the UEs 1591, 1592 of FIG. 15, respectively. This is to say, the inner workings of these entities may be as shown in FIG. 16 and independently, the surrounding network topology may be that of FIG. 15.

In FIG. 16, the OTT connection 1650 has been drawn abstractly to illustrate the communication between the host computer 1610 and the use equipment 1630 via the base station 1620, without explicit reference to any intermediary devices and the precise routing of messages via these devices. Network infrastructure may determine the routing, which it may be configured to hide from the UE 1630 or from the service provider operating the host computer 1610, or both. While the OTT connection 1650 is active, the network infrastructure may further take decisions by which it dynamically changes the routing (e.g., on the basis of load balancing consideration or reconfiguration of the network).

The wireless connection 1670 between the UE 1630 and the base station 1620 is in accordance with the teachings of the embodiments described throughout this disclosure. One or more of the various embodiments improve the performance of OTT services provided to the UE 1630 using the OTT connection 1650, in which the wireless connection 1670 forms the last segment. More precisely, the teachings of these embodiments may improve the power consumption and thereby provide benefits such as extended battery lifetime.

A measurement procedure may be provided for the purpose of monitoring data rate, latency and other factors on which the one or more embodiments improve. There may further be an optional network functionality for reconfiguring the OTT connection 1650 between the host computer 1610 and UE 1630, in response to variations in the measurement results. The measurement procedure and/or the network functionality for reconfiguring the OTT connection 1650 may be implemented in the software 1611 of the host computer 1610 or in the software 1631 of the UE 1630, or both. In embodiments, sensors (not shown) may be deployed in or in association with communication devices through which the OTT connection 1650 passes; the sensors may participate in the measurement procedure by supplying values of the monitored quantities exemplified above, or supplying values of other physical quantities from which software 1611, 1631 may compute or estimate the monitored quantities. The reconfiguring of the OTT connection 1650 may include message format, retransmission settings, preferred routing etc.; the reconfiguring need not affect the base station 1620, and it may be unknown or imperceptible to the base station 1620. Such procedures and functionalities may be known and practiced in the art. In certain embodiments, measurements may involve proprietary UE signaling facilitating the host computer's 1610 measurements of throughput, propagation times, latency and the like. The measurements may be implemented in that the software 1611, 1631 causes messages to be transmitted, in particular empty or 'dummy' messages, using the OTT connection 1650 while it monitors propagation times, errors etc.

Figures 17, 18:
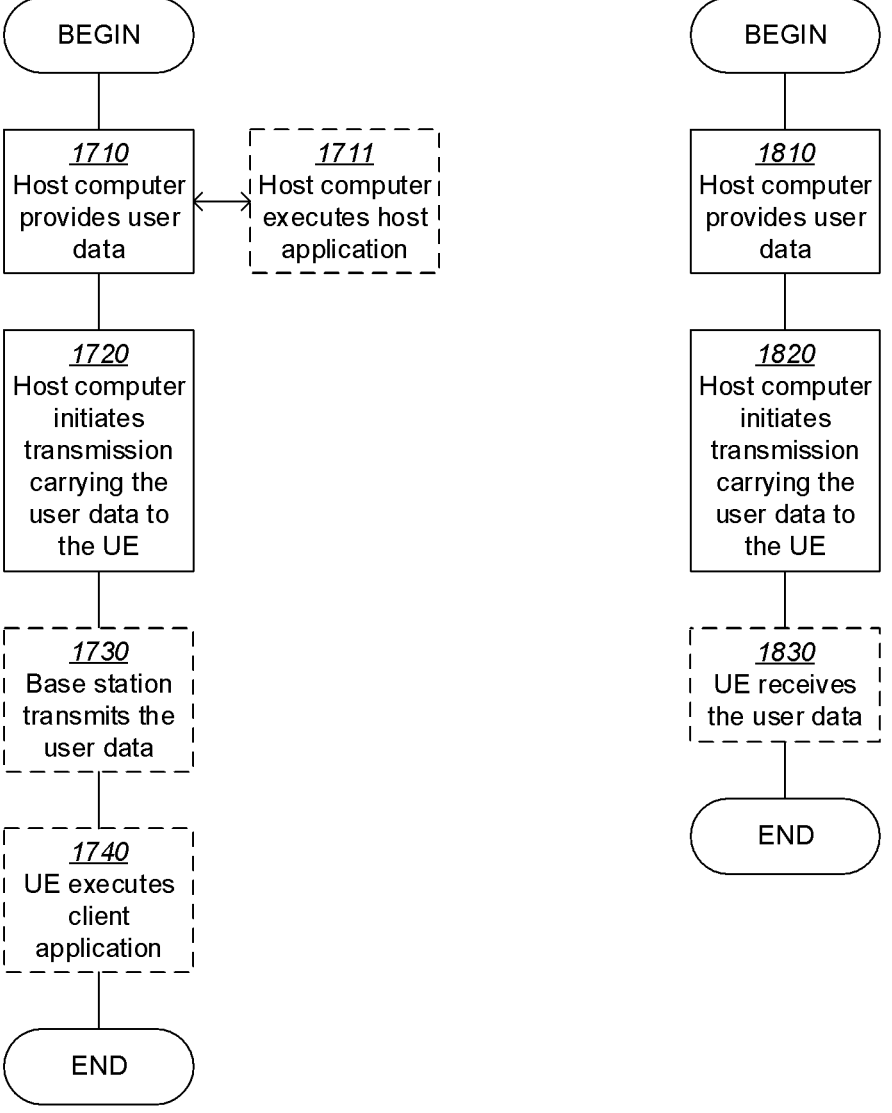
FIGS. 17 to 20 are flowcharts illustrating methods implemented in a communication system including a host computer, a base station and a user equipment.

FIG. 17 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 17 will be included in this section. In a first step 1710 of the method, the host computer provides user data. In an optional substep 1711 of the first step 1710, the host computer provides the user data by executing a host application. In a second step 1720, the host computer initiates a transmission carrying the user data to the UE. In an optional third step 1730, the base station transmits to the UE the user data which was carried in the transmission that the host computer initiated, in accordance with the teachings of the embodiments described throughout this disclosure. In an optional fourth step 1740, the UE executes a client application associated with the host application executed by the host computer.

FIG. 18 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 18 will be included in this section. In a first step 1810 of the method, the host computer provides user data. In an optional substep (not shown) the host computer provides the user data by executing a host application. In a second step 1820, the host computer initiates a transmission carrying the user data to the UE. The transmission may pass via the base station, in accordance with the teachings of the embodiments described throughout this disclosure. In an optional third step 1830, the UE receives the user data carried in the transmission.

Figures 19, 20:
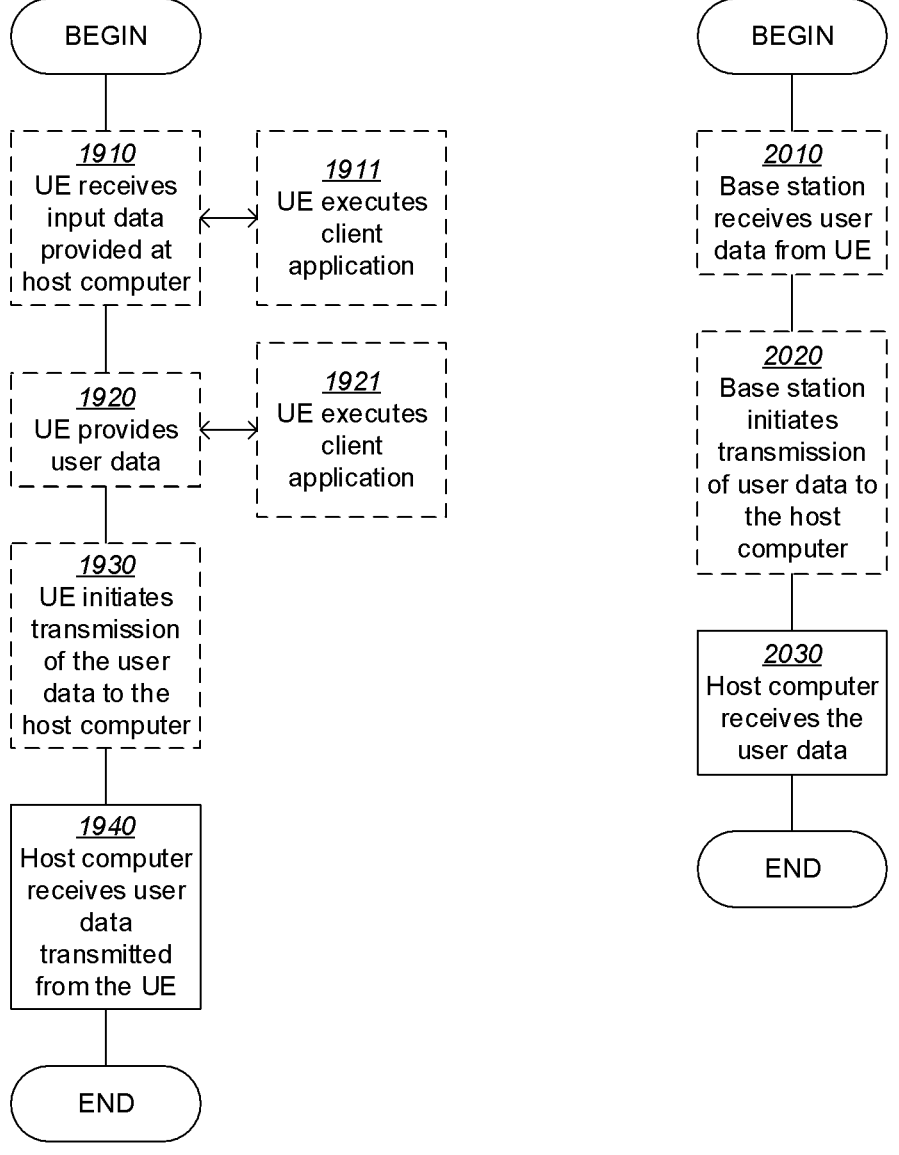

FIG. 19 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 19 will be included in this section. In an optional first step 1910 of the method, the UE receives input data provided by the host computer. Additionally or alternatively, in an optional second step 1920, the UE provides user data. In an optional substep 1921 of the second step 1920, the UE provides the user data by executing a client application. In a further optional substep 1911 of the first step 1910, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1930, transmission of the user data to the host computer. In a fourth step 1940 of the method, the host computer receives the user data transmitted from the UE, in accordance with the teachings of the embodiments described throughout this disclosure.

FIG. 20 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 20 will be included in this section. In an optional first step 2010 of the method, in accordance with the teachings of the embodiments described throughout this disclosure, the base station receives user data from the UE. In an optional second step 2020, the base station initiates transmission of the received user data to the host computer. In a third step 2030, the host computer receives the user data carried in the transmission initiated by the base station.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method in a first terminal device, comprising:
   receiving, at the first terminal device, first information from a second terminal device, wherein:
   the second terminal device serves as a relay between the first terminal device and a core network node; and
   the first information indicates that the second terminal device is in a Radio Resource Control, RRC, Connected, RRC_CONNECTED, state; and
   transmitting, to the core network node, the first information indicating that the second terminal device is in the RRC_CONNECTED state.

2. The method of claim 1, further comprising:
   transmitting, to the core network node, second information indicating an identifier, ID, of the network device and/or third information indicating an ID of the second terminal device.

3. The method of claim 2, wherein the ID of the second terminal device comprises a Cell-Radio Network Temporary Identifier, C-RNTI, or a next generation-5th Generation-Serving-Temporary Mobile Subscriber Identity, ng-5G-S-TMSI, of the second terminal device.

4. The method of claim 2, wherein the first information, the second information, and/or the third information is obtained from the second terminal device via PC5-RRC signaling, or in a Medium Access Control-Control Element, MAC CE, or a control Protocol Data Unit, PDU, of a Service Data Adaptation Protocol, SDAP, Packet Data Coverage Protocol, PDCP, Radio Link Control, RLC, or adaptation layer.

5. The method of claim 2, wherein the first information, the second information, and/or the third information is transmitted to the core network node via the second terminal device.

6. The method of claim 5, wherein
   the first information, the second information, and/or the third information is included in a message destined to the core network node, or
   the first information, the second information, and/or the third information is included in a message terminated at the second terminal device for forwarding to the core network node, the message containing an ID of the core network node.

7. The method of claim 2, further comprising:
   notifying the core network node to release the first information, the second information, and/or the third information when the first terminal device has reselected another relay that is not in the RRC_CONNECTED state, when the first terminal device has reselected a direct link with the network device, or when the second terminal device has transitioned to a different state than the RRC_CONNECTED state.

8. The method of claim 1, wherein the core network node is a serving Access and Mobility Management Function, AMF, node of the first terminal device.

9. The method of claim 1, wherein the network device is a serving next generation NodeB, gNB, of the second terminal device.

10. The method of claim 1, wherein the first terminal device is in an RRC_IDLE or RRC_INACTIVE state.

11. The method of claim 1, wherein the first terminal device and the second terminal device communicate with each other over a sidelink.

12. The method of claim 1, further comprising:
   receiving, from the second terminal device, a paging message for paging the first terminal device; and
   initiating, in response to the paging message, establishment or resumption of a connection with the network device via the second terminal device.

13. The method of claim 12, wherein the paging message is received via PC5-RRC signaling, or in a MAC CE or a control PDU of an SDAP, PDCP, RLC or adaptation layer.

14. The method of claim 12, wherein said initiating comprises:
   initiating a Random Access Channel, RACH, procedure with the network device via the second terminal device, transmitting an RRC message to the network device via the second terminal device, transmitting a MAC CE to the network device via the second terminal device, or transmitting a Physical Uplink Control Channel, PUCCH, to the network device via the second terminal device.

15. The method of claim 14, wherein a message in the RACH procedure or a Physical Random Access Channel, PRACH, preamble or resource used in the RACH procedure indicates that the RACH procedure is for the first terminal device to establish or resume the connection with the network device, the RRC message indicates a request from the first terminal device to establish or resume the connection with the network device, the MAC CE indicates a request from the first terminal device to establish or resume the connection with the network device, or a resource of the PUCCH indicates that the PUCCH is for the first terminal device to establish or resume connection with the network device.

16. A first terminal device, comprising a transceiver, a processor and a memory, the memory comprising instructions executable by the processor whereby the first terminal device is operative to:

receive, at the first terminal device, first information from a second terminal device, wherein:

the second terminal device serves as a relay between the first terminal device and a core network node; and the first information indicates that the second terminal device is in a Radio Resource Control, RRC, Connected, RRC_CONNECTED, state; and transmit, to the core network node, the first information indicating that the second terminal device is in the RRC_CONNECTED state.

17. The first terminal device of claim 16, wherein, by execution of the instructions by the processor, the first terminal device is further operable to:

transmit, to the core network node, second information indicating an identifier, ID, of the network device and/or third information indicating an ID of the second terminal device.

18. The first terminal device of claim 17, wherein the ID of the second terminal device comprises a Cell-Radio Network Temporary Identifier, C-RNTI, or a next generation-5th Generation-Serving-Temporary Mobile Subscriber Identity, ng-5G-S-TMSI, of the second terminal device.

19. The first terminal device of claim 17, wherein the first information, the second information, and/or the third information is obtained from the second terminal device via PC5-RRC signaling, or in a Medium Access Control-Control Element, MAC CE, or a control Protocol Data Unit, PDU, of a Service Data Adaptation Protocol, SDAP, Packet Data Coverage Protocol, PDCP, Radio Link Control, RLC, or adaptation layer.

20. The first terminal device of claim 17, wherein the first information, the second information, and/or the third information is transmitted to the core network node via the second terminal device.

* * * * *